United States Patent
Radcliffe et al.

(10) Patent No.: US 8,231,973 B2
(45) Date of Patent: *Jul. 31, 2012

(54) FLUORO(METH)ACRYLATE POLYMER COMPOSITION SUITABLE FOR LOW INDEX LAYER OF ANTIREFLECTIVE FILM

(75) Inventors: Marc D. Radcliffe, Newport, MN (US); Thomas P. Klun, Lakeland, MN (US); Lan H. Liu, Rosemount, MN (US); Richard J. Pokorny, Maplewood, MN (US); Suresh Iyer, Woodbury, MN (US); Zai-Ming Qiu, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 527 days.

This patent is subject to a terminal disclaimer.

(21) Appl. No.: 12/303,584

(22) PCT Filed: May 4, 2007

(86) PCT No.: PCT/US2007/068197
§ 371 (c)(1),
(2), (4) Date: Dec. 5, 2008

(87) PCT Pub. No.: WO2007/146509
PCT Pub. Date: Dec. 21, 2007

(65) Prior Publication Data
US 2010/0173093 A1    Jul. 8, 2010

(51) Int. Cl.
*B32B 27/00* (2006.01)
*C08F 2/48* (2006.01)
*C08F 14/18* (2006.01)

(52) U.S. Cl. ........ 428/421; 427/508; 427/520; 522/120; 522/121; 522/173; 522/186; 522/187; 525/326.2; 525/326.3; 560/169; 560/205; 560/223

(58) Field of Classification Search ............ 427/508; 526/242, 247; 522/120, 121, 187; 525/200, 525/326.2, 326.3; 560/169, 205, 223
See application file for complete search history.

(56) References Cited

U.S. PATENT DOCUMENTS

| | | | |
|---|---|---|---|
| 381,087 A | 5/1974 | Mitsch et al. | |
| 383,336 A | 9/1974 | Land et al. | |
| 5,756,209 A * | 5/1998 | Hale | 428/392 |
| 5,858,519 A | 1/1999 | Klinger et al. | |
| 596,565 A | 10/1999 | Kubo et al. | |
| 5,962,611 A * | 10/1999 | Meijs et al. | 526/247 |
| 5,986,020 A * | 11/1999 | Campbell et al. | 526/64 |
| 605,131 A | 4/2000 | Cano et al. | |
| 6,087,010 A * | 7/2000 | Yoshida et al. | 428/421 |
| 6,165,563 A * | 12/2000 | Chandran et al. | 427/516 |

(Continued)

FOREIGN PATENT DOCUMENTS

EP    0632059    4/1995

(Continued)

*Primary Examiner* — Mark Eashoo
*Assistant Examiner* — Nicole M Buie-Hatcher
(74) *Attorney, Agent, or Firm* — Carolyn A. Fischer

(57) ABSTRACT

Antireflective film articles and low refractive index coating compositions are described that comprises a fluorinated free-radically polymerizable polymeric (e.g. intermediate) material. The free-radically polymerizable fluorinated polymeric intermediate comprises the reaction product of i) at least one multi-functional free-radically polymerizable material having a fluorine content of at least 25 wt-%, and ii) optionally other multi-functional free-radically polymerizable material. The total amount of multi-functional materials is preferably at least about 25 wt-%.

25 Claims, 2 Drawing Sheets

U.S. PATENT DOCUMENTS

| | | | |
|---|---|---|---|
| 6,172,129 B1 * | 1/2001 | Fan et al. | 522/167 |
| 634,386 A1 | 2/2002 | Suzuki | |
| 6,376,572 B1 | 4/2002 | Turri | |
| 6,673,851 B2 * | 1/2004 | Moy et al. | 522/173 |
| 683,339 A1 | 12/2004 | Ishizeki et al. | |
| 684,657 A1 | 1/2005 | Yamaguchi et al. | |
| 689,324 A1 | 5/2005 | Foreman et al. | |
| 689,373 A1 | 5/2005 | Kausch | |
| 702,603 A1 | 4/2006 | Itoh et al. | |
| 709,090 A1 | 8/2006 | Itoh et al. | |
| 710,161 A1 | 9/2006 | Coggio et al. | |
| 7,615,283 B2 * | 11/2009 | Radcliffe et al. | 428/421 |
| 2003/0168783 A1 | 9/2003 | Dams | |
| 2004/0181008 A1 | 9/2004 | Hanazawa et al. | |
| 2005/0182199 A1 | 8/2005 | Jing et al. | |
| 2006/0008596 A1 * | 1/2006 | Pokorny et al. | 428/1.1 |
| 2007/0286993 A1 | 12/2007 | Radcliffe et al. | |

FOREIGN PATENT DOCUMENTS

| | | |
|---|---|---|
| EP | 0 457 610 | 8/1995 |
| EP | 0863128 | 9/1998 |
| EP | 1279443 | 1/2003 |
| JP | 6-136062 | 5/1994 |
| JP | 6-211945 | 8/1994 |
| JP | 11-2702 | 1/1999 |
| JP | 2000-301053 | 10/2000 |
| JP | 2002-332313 | 11/2002 |
| JP | 2003-183332 | 7/2003 |
| JP | 2004-122611 | 4/2004 |
| WO | 2006/030721 | 3/2006 |
| WO | 2006/073867 | 7/2006 |

* cited by examiner

FLUORO(METH)ACRYLATE POLYMER COMPOSITION SUITABLE FOR LOW INDEX LAYER OF ANTIREFLECTIVE FILM

CROSS REFERENCE TO RELATED APPLICATIONS

This application is a national stage filing under 35 U.S.C. 371 of PCT/US2007/068197, filed May 4, 2007, which claims priority to U.S. application Ser. No. 11/423,791, filed Jun. 13, 2006, the disclosure of which is incorporated by reference in its entirety herein.

BACKGROUND

Various antireflective polymer films ("AR films") have been described. The physical principles by which antireflection films and coatings function are well known. Several overviews can be found, for example, in *Optical Engineering*, S. Muskiant Ed, Vol. 6, *Optical Materials*, Chap. 7, p 161, 1985 and as shown in U.S. Pat. No. 3,833,368 to Land, et al. AR films are often constructed of alternating high and low refractive index ("RI") polymer layers of the correct optical thickness. With regards to visible light, this thickness is on the order of one-quarter of the wavelength of the light to be reflected. The human eye is most sensitive to light around 550 nm. Therefore it is desirable to design the low and high index coating thicknesses in a manner that minimizes the amount of reflected light in this optical range (e.g. 3% or lower).

As described in Groh and Zimmerman, *Macromolecules*, Vol. 24 p. 6660 (1991), it is known that fluorine containing materials have a low refractive index and are therefore useful in the low refractive index layer of AR films.

Various AR coatings using fluoro(meth)acrylate polymers and fluorine containing materials have also been described. See for example JP 9-155425.

Although increased fluorine content decreases the refractive index of the low refractive index coating composition, the concurrent decrease in surface energy can result in poor coating and optical cosmetic properties as well as a loss in interfacial adhesion with the adjacent high refractive index layer. Also, highly fluorinated materials have been known to reduce the hardness and durability of the coating.

SUMMARY

In some embodiments, antireflective films are described comprising a low refractive index layer and a high refractive index layer coupled to the low refractive index layer. In one aspect, the low refractive index layer comprises the reaction product of A) a free-radically polymerizable fluorinated polymeric intermediate comprising the reaction product of i) at least one multi-functional free-radically polymerizable material having a fluorine content of at least about 25 wt-%, and ii) optionally at least one multi-functional free-radically polymerizable material having a fluorine content ranging from 0 to less than 25 wt-%, wherein the total amount of multi-(meth)acrylate monomer is at least 25 wt-% based on wt-% solids of the polymerizable organic composition; and B) at least one fluorinated free-radically polymerizable material.

The mixture of A) and B) is preferably cured by exposure to (e.g. ultraviolet light) radiation. The cured low refractive index polymeric composition may comprise copolymerization reaction products of A) and B). The cured low refractive index polymeric composition may also comprise polymerization products of B) thereby forming an interpenetrating polymer network.

In another embodiment, a low refractive index composition is described comprising at least 5 wt-% of the free-radically polymerizable fluorinated polymer (e.g. intermediate) dissolved or dispersed in a (e.g. non-fluorinated) organic solvent. The composition typically comprises at least 10 wt-% of reaction products having a polystyrene equivalent Mw of greater than 1,000,000 g/mole. Further, the composition typically comprises at least 20 wt-% of reaction products having a polystyrene equivalent Mw ranging from about 5,000 g/mole to 1,000,000 g/mole, as well as unreacted or partially reacted free-radically polymerizable starting materials.

In another embodiment a method of making a low refractive index composition is described comprising combining A) the free-radically polymerizable fluorinated polymeric intermediate with B) at least one fluorinated free-radically polymerizable material, coating the composition onto a high refractive index layer, and photocuring the composition.

The low refractive index layer described herein is amenable to providing a durable low refractive index surface layer or antireflective film. In one aspect, the low refractive index layer comprises surface modified inorganic nanoparticles having a low refractive index. The high refractive index layer preferably comprises surface modified high refractive index inorganic nanoparticles dispersed in a crosslinked organic material. In such embodiment, durability can advantageously be obtained in the absence of an additional hardcoat layer. Alternatively however, the antireflective film may comprise a hardcoat layer below the low refractive index layer or the high refractive index layer may consist of a layer of high refractive index inorganic material.

The antireflective films described herein may be provided as a film article typically comprising a substrate below the high refractive index layer and optionally a (e.g. pressure sensitive) adhesive layer (e.g. covered with a release liner) for adhering the film article to a surface to render to the surface antireflective. Alternatively, the low index composition may be applied directly to a surface alone or in combination with a high index layer. The antireflective film and coating compositions are particularly suitable for illuminated and non-illuminated display surfaces as well as for application to light transmissive substrates and articles. The low index composition can also be applied to non-transmissive substrates and articles such as signage.

In each of these embodiments, B) preferably also has a fluorine content of at least about 25 wt-%. Further, at least about 50 wt-% of the polymerizable organic composition preferably comprises free-radically polymerizable materials having a fluorine content of at least 25 wt-%. Materials having a fluorine content ranging from 0 to less than 25 wt-% typically comprise less than 30 wt-% of the polymerizable organic composition. Further, A), B), or a combination thereof, may further comprise at least one (e.g. non-fluorinated) crosslinker having at least three free-radically polymerizable groups. Various free-radically polymerizable materials may be employed including fluoroalkyl materials, fluoroalkylene material, fluoropolyether materials, and various combinations thereof. The free-radically polymerizable materials may comprise (meth)acryl groups such as (meth)acrylate groups. In some embodiments, at least one perfluoropolyether (meth)acrylate compound is employed such as those having an HFPO-moiety.

DETAILED DESCRIPTION OF PREFERRED EMBODIMENTS OF THE INVENTION

Figure 1:
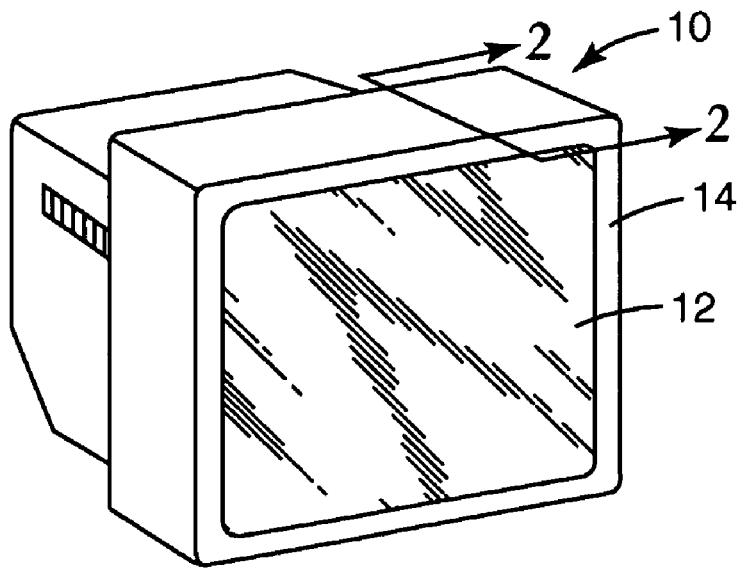
FIG. 1 is perspective view of an article having an optical display.

The recitation of numerical ranges by endpoints includes all numbers subsumed within the range (e.g. the range 1 to 10 includes 1, 1.5, 3.33, and 10).

The phrase "free-radically polymerizable" refers to monomers, oligomers, and polymers having functional groups that participate in crosslinking reactions upon exposure to a suitable source of free radicals. Free-radically polymerizable group include for example (meth)acryl groups, —SH, allyl, or vinyl. The free-radically polymerizable group may be halogenated with for example fluorine such as in the case of —COCF=$CH_2$.

A preferred free-radically polymerizable group is "(meth)acryl" with includes (meth)acrylamides, and (meth)acrylates optionally substituted with for example fluorine and sulfur. A preferred (meth)acryl group is acrylate. Multi-(meth)acrylate materials comprise at least two polymerizable (meth)acrylate groups; whereas as mono-(meth)acrylate material has a single (meth)acrylate group. The (meth)acrylate groups may be pendant groups, yet are typically present as terminal groups.

As used herein, "wt-%" refers to the sum of the solid components with the exception of solvent. Unless specified otherwise, the concentration of materials is typically expressed with reference to wt-% solids of the organic composition (i.e. prior to the addition of inorganic nanoparticles).

Presently described are antireflective film articles and low refractive index coating compositions comprising a fluorinated free-radically polymerizable polymeric (e.g. intermediate) material. The free-radically polymerizable material will be described herein with respect to (meth)acrylate materials. However, similar results may be obtained by the use of other free-radically polymerizable groups, as known in the art.

The low refractive index layer comprises the reaction product of a A) fluoro(meth)acrylate polymeric intermediate and B) at least one fluorinated (meth)acrylate material. The mixture of A) and B) is preferably cured by exposure to (e.g. ultraviolet light) radiation. The cured low refractive index polymeric composition may comprise copolymerization reaction products of A) and B). The cured low refractive index polymeric composition is surmised to also comprise polymerization products of B). The fluoro (meth)acrylate polymer intermediate may covalently bond to other components within the low refractive index coating composition. Further, other optional components of the low refractive index coating, such as non-fluorinated crosslinker, may polymerize physically entangling the fluoro (meth)acrylate polymer intermediate thereby forming an interpenetrating network.

The A) fluoro (meth)acrylate polymeric intermediate comprises the reaction product of i) at least one fluorinated multi-(meth)acrylate monomer having a fluorine content of at least about 25 wt-%; and ii) optionally one or more multi-(meth) acrylate materials having a fluorine content ranging from 0 to less than 25 wt-%. Accordingly, the fluorine content of the multi-(meth)acrylate material of ii) is less than i). The optional multi-(meth)acrylate material may include monomer(s), oligomer(s), polymer(s), surface modified inorganic nanoparticles having free-radically polymerizable moieties, as well as the various combinations of such materials. The total amount of multi-(meth)acrylate materials is generally at least 25 wt-% based on wt-% solids of the polymerizable organic composition.

The fluoro(meth)acrylate polymer intermediate solution is surmised to comprise a mixture of unreacted free-radically polymerizable starting materials, oligomeric species, and polymeric species having a hyperbranched structure. A hyperbranched polymer is defined as any polymer in which the structural repeat unit has a connectivity of more than two; this definition may be extended to hypercrosslinked polymers (in which macrocycles are present, but not to ladder and spiro polymers).

A two-step process is employed to prepare the low refractive index composition. A first (e.g. solution) polymerization reaction utilizes dilute organic solvent conditions to form a hyperbranched fluoroacrylate polymer (e.g. a nanogel). The hyberbranched fluoroacrylate is then utilized as a reactant in a second (e.g. photo) polymerization reaction under substantially 100% solids conditions to form the fluorinated crosslinked system that is surmised an interpenetrating network of the (nanogel) polymer in a crosslinked (meth)acrylate host.

The described hyperbranched polymers are surmised to have a high molecular weight while remaining soluble or dispersible. It is likely that the polymer intermediate, as initially prepared is fully solvated (e.g. with ethyl acetate) and is relatively easy to solvent-exchange and thus accepts other free-radically polymerizable monomer molecules within its polymeric matrix. When coated, concentrated or dried, and finally cured, the intermediate polymer tightens and bonds to or around the monomers, reinforcing and toughening the final films.

The hyperbranched polymer of this invention also has certain similarities to materials described in some literature as microgels or nanogels. Polymer nanogel materials are formed by increasing the ratio of solvent present during the polymerization reaction, thus increasing the probability of internal cyclization as opposed to chain extension. Under conditions when macrogellation does occur, the typical polymer either precipitates from solution, or more commonly, the solution becomes gelatinous and non-fluid. In the formation of the soluble nanogels described herein, the regimes of micro- and macrogelation are separated by a sharply defined critical volume fraction of polymer in solution. This critical volume is somewhat analogous with the gel transition of Flory-Stockmayer gelation theory. At concentrations below the critical volume fraction, soluble hyperbranched polymers with (i.e. polystyrene equivalent) molecular weights of at least $10^6$ to $10^9$ g/mol can be obtained. The critical reaction concentration depends on crosslink density and the structural parameters of the molecules.

It has been found that multifunctional (meth)acrylates can be polymerized, yet still result in soluble nanogels. Further, increasing the amount of multifunctional acrylates can provide improved coating and mechanical properties as described herein.

The A) fluoro (meth)acrylate polymeric intermediate comprises the reaction product of i) at least one fluorinated multi-(meth)acrylate monomer having a fluorine content of at least about 25 wt-%. Highly fluorinated multi-(meth)acrylate monomers are characterized by having a low refractive index. Various fluorinated multi-(meth)acrylate monomers having a fluorine content of at least about 25 wt-% are known. In some embodiments, the low refractive index multi-(meth)acrylate monomer has a fluorine content of at least 30 wt-%, at least 35 wt-%, at least 40 wt-%, at least 45 wt-%, or at least 50 wt-%.

For the preparation of the fluoro (meth)acrylate polymer intermediate, a single low index fluorinated multi-(meth)acrylate monomer can be homopolymerized. Alternatively, two or more low refractive index fluorinated multi-(meth)acrylate monomer(s) can be copolymerized with each other. Further yet, one or more low refractive index fluorinated multi-(meth)acrylate monomers can be copolymerized with other non-fluorinated and/or fluorinated mono- and multi-(meth)acrylate materials. The fluorinated mono-(meth) acrylate materials may also have a high fluorine content (i.e. at least 25 wt-%).

In yet another aspect, one or more low refractive index fluorinated multi-(meth)acrylate monomers can be copolymerized with surface modified inorganic nanoparticles having multi-(meth)acrylate functionality.

In some embodiments A), B) or a combination thereof, comprises at least one non-fluorinated crosslinker having at least three (meth)acrylate groups. Typically, A) includes at least 5 wt-% and less than 15 wt-% (e.g. about 10 wt-%) of non-fluorinated crosslinker. Further, B) may include at least 5 wt-% and less than 30 wt-% (e.g. about 25 wt-%) of non-fluorinated crosslinker. B) generally includes no greater than 30 wt-% non-fluorinated crosslinker. Hence, the total amount of non-fluorinated crosslinker may range from about 10 wt-% to about 30 wt-%.

In some embodiments, the total amount of multi-(meth)acrylate material, e.g. the sum of fluorinated and non-fluorinated multi-(meth)acrylate monomers, is at least 30 wt-%, 40 wt-%, 50 wt-%, 60 wt-%, 70 wt-%, 80 wt-%, 90 wt-% and even 100% based on the total solids of the organic portion on the reaction mixture. The total amount of low refractive index fluorinated multi-(meth)acrylate (i.e. having a fluorine content of at least about 25 wt-%) may be at least 30 wt-%, 40 wt-%, 50 wt-%, 60 wt-%, 70 wt-%, 80 wt-%, 90 wt-% and even 100% based on the total solids of the organic portion of the reaction mixture (i.e. excluding any inorganic nanoparticle).

The fluorinated (meth)acrylate monomer of component B) may be the same as or different than the fluorinated multi-(meth)acrylate monomer of component A) employed to prepare the fluoro(meth)acrylate intermediate. In at least some embodiments, B) also comprises a fluorine content of at least 25 wt-%.

Various fluorinated mono- and multi-functional free-radically polymerizable monomers, oligomers, and polymers may be employed in the preparation of the low refractive index layer and fluoro(meth)acrylate polymer (e.g. intermediate) described herein. Such materials generally comprises free-radically polymerizable moieties in combination with (per)fluoropolyether moieties, (per)fluoroalkyl moieties, and (per)fluoroalkylene moieties. Within each of these classes are multi-functional species having a high fluorine content, (e.g. of at least 25 wt-%) that can be employed as i). Other species within each class, having fluorine content less than 25 wt-%, can be employed as ii) and/or as an auxiliary component. In some embodiments, an auxiliary fluorinated (meth)acrylate monomer can aid in compatibilizing the low refractive index or other fluorinated materials present in the reaction mixture.

The low refractive index layer and fluoro(meth)acrylate polymer may be prepared from a variety of (per)fluoropolyether (meth)acrylate compounds. Perfluoropolyether (meth)acryl compounds can be represented by the following Formula (1):

$$(R_f)—[(W)—(R_A)_d]_e \quad \text{(Formula 1)}$$

wherein $R_f$ is a (per)fluoropolyether group; W is a linking group; and $R_A$ is a free-radically polymerizable group such as (meth)acryl, —SH, allyl, or vinyl, and is preferably a (meth)acrylate or —COCF=CH$_2$ group; d ranges from 1 to 6; and e is 1 or 2.

The perfluoropolyether group $R_f$ can be linear, branched, cyclic, or combinations thereof and can be saturated or unsaturated. The perfluoropolyether has at least two catenated oxygen heteroatoms. Exemplary perfluoropolyethers include, but are not limited to, those that have perfluorinated repeating units selected from the group of —(C$_p$F$_{2p}$)—, —(C$_p$F$_{2p}$O)—, —(CF(Z))—, —(CF(Z)O)—, —(CF(Z)C$_p$F$_{2p}$O)—, —(C$_p$F$_{2p}$CF(Z)O)—, —(CF$_2$CF(Z)O)—, or combinations thereof. In these repeating units, p is typically an integer of 1 to 10. In some embodiments, p is an integer of 1 to 8, 1 to 6, 1 to 4, or 1 to 3. The group Z is a perfluoroalkyl group, perfluoroether group, perfluoropolyether, or a perfluoroalkoxy group, all of which can be linear, branched, or cyclic. The Z group typically has no more than 12 carbon atoms, no more than 10 carbon atoms, or no more than 9 carbon atoms, no more than 4 carbon atoms, no more than 3 carbon atoms, no more than 2 carbon atoms, or no more than 1 carbon atom. In some embodiments, the Z group can have no more than 4, no more than 3, no more than 2, no more than 1, or no oxygen atoms. In these perfluoropolyether structures, the different repeat units can be distributed randomly along the chain.

$R_f$ can be monovalent or divalent. In some compounds where $R_f$ is monovalent, the terminal groups can be (C$_p$F$_{2p+1}$)—, (C$_p$F$_{2p+1}$O)—, (X'C$_p$F$_{2p}$O)—, or (X'C$_p$F$_{2p+1}$)— where X' is hydrogen, chlorine, or bromine and p is an integer of 1 to 10. In some embodiments of monovalent $R_f$ groups, the terminal group is perfluorinated and p is an integer of 1 to 10, 1 to 8, 1 to 6, 1 to 4, or 1 to 3. Exemplary monovalent $R_f$ groups include CF$_3$O(C$_2$F$_4$O)$_n$CF$_2$—, C$_3$F$_7$O(CF$_2$CF$_2$CF$_2$O)$_n$CF$_2$CF$_2$—, and C$_3$F$_7$O(CF(CF$_3$)CF$_2$O)$_n$CF(CF$_3$)— wherein n has an average value of 0 to 50, 1 to 50, 3 to 30, 3 to 15, or 3 to 10.

Suitable structures for divalent $R_f$ groups include, but are not limited to, —CF$_2$O(CF$_2$O)$_q$(C$_2$F$_4$O)$_n$CF$_2$—, —(CF$_2$)$_3$O(C$_4$F$_8$O)$_n$(CF$_2$)$_3$—, —CF$_2$O(C$_2$F$_4$O)$_n$CF$_2$—, —CF$_2$CF$_2$O(CF$_2$CF$_2$CF$_2$O)$_n$CF$_2$CF$_2$—, and —CF(CF$_3$)(OCF$_2$CF(CF$_3$))$_s$OC$_t$F$_{2t}$O(CF(CF$_3$)CF$_2$O)$_n$CF(CF$_3$)—, wherein q has an average value of 0 to 50, 1 to 50, 3 to 30, 3 to 15, or 3 to 10; n has an average value of 0 to 50, 3 to 30, 3 to 15, or 3 to 10; s has an average value of 0 to 50, 1 to 50, 3 to 30, 3 to 15, or 3 to 10; the sum (n+s) has an average value of 0 to 50 or 4 to 40; the sum (q+n) is greater than 0; and t is an integer of 2 to 6.

As synthesized, compounds according to Formula (1) typically include a mixture of $R_f$ groups. The average structure is the structure averaged over the mixture components. The values of q, n, and s in these average structures can vary, as long as the compound has a number average molecular weight of at least about 400. Compounds of Formula (1) often have a molecular weight (number average) of 400 to 5000, 800 to 4000, or 1000 to 3000.

The linking group W between the perfluoropolyether segment and (meth)acryl or —COCF=CH$_2$ endgroup includes a divalent or higher valency group selected from an alkylene, arylene, heteroalkylene, or combinations thereof and an optional divalent group selected from carbonyl, ester, amide, sulfonamido, or combinations thereof. W can be unsubstituted or substituted with an alkyl, aryl, halo, or combinations thereof. The W group typically has no more than 30 carbon atoms. In some compounds, the W group has no more than 20 carbon atoms, no more than 10 carbon atoms, no more than 6 carbon atoms, or no more than 4 carbon atoms. For example, W can be an alkylene, an alkylene substituted with an aryl group, or an alkylene in combination with an arylene or an alkyl ether or alkyl thioether linking group.

Perfluoropolyether acrylate compounds can be synthesized by known techniques such as described in U.S. Pat. Nos. 3,553,179 and 3,544,537 as well as U.S. Patent Application Publication No. 2004/0077775.

In some embodiments, the perfluoropolyether group comprises an "HFPO—" end group, i.e. the end group $F(CF(CF_3)CF_2O)_aCF(CF_3)$— (of the methyl ester $F(CF(CF_3)CF_2O)_aCF(CF_3)C(O)OCH_3$) wherein "a" averages 2 to 15. In some embodiments, a averages between 3 and 10 or a averages between 5 and 8. Such compound generally exist as a distribution or mixture of oligomers with a range of values for a, so that the average value of a may be non-integer. In one embodiment, a averages about 6.2.

An exemplary low refractive index perfluoropolyether multi-(meth)acrylate monomer is HFPO—C(O)N(H)CH$_2$CH(OC(O)CH=CH$_2$)CH$_2$OC(O)CH=CH$_2$, calculated to have a fluorine content of 53.4%. This monomer can be prepared as described as described in U.S. Patent Application Publication No. 2005/0249940-A1. (See FC-4). Other low refractive index multi-(meth)acrylate perfluoropolyether compounds include $H_2C$=CHC(O)OCH$_2$CH$_2$N(H)(O)C—HFPO C(O)N(H)CH$_2$CH$_2$OC(O)CH=CH$_2$, having 58.1% fluorine and $(H_2C$=CHC(O)OCH$_2)_2$CH$_3$CH$_2$CN(H)(O)C—HFPOC(O)N(H)CCH$_2$CH$_3$(CH$_2$OC(O)CH=CH$_2)_2$ having 50.1% fluorine. These compounds can be prepared as described in the U.S. Patent Application Publication No. 2006/0216524 and Pending U.S. application Ser. No. 11/277, 162, filed Mar. 22, 2006 (See Preparations No. 28. and 30).

Other low refractive index fluoropolyether multi-(meth)acrylate compounds are described in U.S. Pat. Nos. 3,810,874 and 4,321,404. A representative compound is given by the structure $CH_2$=CHC(O)OCH$_2$CF$_2$O(CF$_2$CF$_2$O)$_{mm}$(CF$_2$O)$_{nn}$CH$_2$OC(O)CH=CH$_2$, where mm and nn designate that the number of randomly distributed perfluoroethyleneoxy and perfluoromethyleneoxy backbone repeating units, respectively, mm and nn having independently values, for example from 1 to 50, and the ratio of mm/nn is 0.2 to 1 to 5/1.

One preferred high fluorine containing multi-functional free-radically polymerizable material is a perfluoropolyether multi-(meth)acryl compound preparable by Michael-type addition of a reactive (per)fluoropolyether with a poly(meth)acrylate. Such compounds are further described in US Publication No. 2005/0250921A1. An exemplary Michael adduct having a high fluorine content is the adduct of HFPO—C(O)N(H)CH$_2$CH$_2$CH$_2$N(H)CH$_3$ with trimethylolpropane triacrylate (TMPTA), having a fluorine content of 52.02 wt-%.

Another preferred high fluorine containing multi-functional free-radically polymerizable material is a (per)fluoro alkylene multi-(meth)acryl compound prepared by a Michael-type addition of a reactive (per)fluoro alkylene multi-(meth)acrylate with an amine compound having 2 to 4 Michael-type addition hydrogens. One exemplary adduct is prepared by the reaction of $CH_2$=CHC(O)—OCH$_2$(CF$_2)_4$CH$_2$O—C(O)CH=CH$_2$ (commonly referred to as 8F-HDDA) with N-methyl-1,3-prop anediamine.

Another preferred high fluorine containing material is a (e.g. perfluoropolyether) acrylate oligomer reported by the supplier to have a refractive index of 1.341 commercially available from Sartomer under the trade designation "CN4000". In view of the low refractive index, this material is believed to have a fluorine content of at least about 50 wt-%. Based on NMR analysis, CN4000 has a molecular weight (Mn) of about 1300 g/mole.

Other commercially available low refractive index perfluoropolyether compounds include a perfluoropolyether caprolactone diacrylate compound, available from Cytonix Corporation, Beltsville, Md., under the trade designation "Fluor N 1939A" and perfluoropolyether glycol diacrylate, also available from Cytonix Corporation under the trade designation "Fluor N 1970A"

Other high fluorine perfluoropolyether (meth)acrylate from can be prepared by reaction of a commercially available perfluoropolyether compounds (such as available from Solvay Solexis under the trade designation "Fomblin Zdol 2000") with acryloyl chloride using methods described in Example 15 of U.S. Pat. No. 3,810,874.

In some embodiments, the perfluoropolyether (meth)acrylate compound(s) may be characterized as perfluoropolyether urethane compounds. Such materials generally include at least one polymerizable (e.g. terminal) (meth)acrylate moiety and at least one (optionally repeating) unit including a (per)fluoropolyether group bonded by means of a linking group having a valency of at least two to a urethane or urea linkage. The urethane and urea linkage is typically —NHC(O)X— wherein X is O, S or NR; and R is H or an alkyl group having 1 to 4 carbon. The perfluoropolyether moiety is preferably a HFPO— moiety, as previously described. Various suitable compounds are described in U.S. Patent Application Publication No. 2006/0216524 and Pending U.S. application Ser. No. 11/277,162, filed Mar. 22, 2006. One exemplary high fluorine perfluoropolyether urethane (meth)acrylate is HFPO—C(O)NHC$_2$H$_4$OC(O)NHC$_2$H$_4$OC(O)C(CH$_3$)=CH$_2$, wherein HFPO is $F(CF(CF_3)CF_2O)aCF(CF_3)$— and "a" averages 2 to 15.

Various (per)fluoroalkylene multi-(meth)acrylates are known. Various commercially available low refractive index species are described in Table 1 as follows:

TABLE 1

| Chemical Description | Supplier (Location) | Wt-% Fluorine |
|---|---|---|
| 2,2,3,3,4,4,5,5-octafluorohexane-1,6-diacrylate | Exfluor Research Corp., Round Rock, TX | 41.06 |
| 2,2,3,3,4,4,5,5-octafluoro hexane-1,6-dimethacrylate | Exfluor Research Corp. | 38.16 |
| 2,2,3,3-tetrafluorobutane-1,4-diacrylate | Oakwood Products Inc., West Columbia, SC | 28.13 |
| 2,2,3,3-tetrafluorobutane-1,4-dimethacrylate | Oakwood Products Inc. | 25.49 |
| fluorinated tetraethylene glycol diacrylate | Oakwood Products Inc. | |
| 2,2,3,3,4,4-hexafluoropentane-1,5-diacrylate | SynQuest Laboratories, Inc. Alachua, FL | 35.6 |

Low refractive index perfluoroalkyl multi-(meth)acrylate compounds can be synthesized. For example, $C_4F_9SO_2N(C_2H_4OC(O)CH$=$CH_2)_2$ (Mn of 567.9 MW and fluorine content of 30.11%) and $C_4F_9SO_2N(C_2H_4OC(O)C(CH_3)$=$CH_2)_2$ (Mn of 595.99 and fluorine content of 28.69%) can be synthesized by first preparing the fluorochemical diol FBSEE ($C_4F_9SO_2N(C_2H_4OH)_2$) as described in column 5, line 31 and in FIG. 9 of U.S. Pat. No. 3,734,962 (1973) and then preparing the acrylate derivative by the method described in Example 2B of WO 01/30873 to Savu et al.

Component A) and/or B) can optionally include various fluorinated monoacrylate materials including for example 2,2,2-trifluoroethyl (meth)acrylate; 2,2,3,3,3-pentafluoropropyl (meth)acrylate; 2,2,3,3,4,4,4-heptafluorobutyl (meth)acrylate; 2,2,3,3,4,4,5,5,5-nonafluoropentyl (meth)acrylate; 2,2,3,3,4,4,5,5,6,6,6-undecafluorohexyl (meth)acrylate; 2,2, 3,3,4,4,5,5,6,6,7,7,7-tridecafluoroheptyl (meth)acrylate; 2,2,3,3,4,4,5,5,6,6,7,7,8,8,8-pentadecafluoro octyl (meth)acrylate; 3,3,4,4,5,5,6,6,7,7,8,8,8-tridecafluoro octyl (meth)acrylate; 2,2,3,3,4,4,5,5,6,6,7,7,8,8,9,9,10,10,10-nonadecafluorodecyl (meth)acrylate; 3,3,4,4,5,5,6,6,7,7,8,8,9,9,10,10,10-heptadecafluorodecyl (meth)acrylate; 2-trifluoromethyl-3,3,3-trifluoropropyl (meth)acrylate; 3-trifluoromethyl-4,4,4-trifluorobutyl (meth)acrylate; 1-methyl-2,2,3,3,3-pentafluoropropyl (meth)acrylate; 1-methyl-2,2,3,3,4,4,4-heptafluorobutyl (meth)acrylate; 2,2,3,3,4,4-hexafluorocyclobutyl (meth)acrylate; 2,2,3,3,4,4,5,5-octafluorocyclopentyl (meth)acrylate; 2,2,3,3,4,4,5,5,6,6-decafluorocyclohexyl (meth)acrylate; 2,2,3,3,4,4,5,5,6,6,7,7-dodecafluorocycloheptyl (meth)acrylate; 2,2,3,3,4,4,5,5,6,6,7,7,8,8-tetradecafluorocyclooctyl (meth)acrylate; 2-trifluoromethylcyclobutyl (meth)acrylate; 3-trifluoromethyl cyclobutyl (meth)acrylate; 2-trifluoromethyl cyclopentyl (meth)acrylate; 3-trifluoromethyl cyclopentyl (meth)acrylate; 2-trifluoromethyl cyclohexyl (meth)acrylate; 3-trifluoromethyl cyclohexyl (meth)acrylate; 4-trifluoromethyl cyclohexyl (meth)acrylate; 2-trifluoromethyl cycloheptyl (meth)acrylate; 3-trifluoromethyl cycloheptyl (meth)acrylate; and 4-trifluoromethylcycloheptyl (meth)acrylate.

Various perfluoropolyether mono-(meth)acrylate compounds are also known. One such exemplary low refractive index material is HFPO—C(O)NHCH$_2$CH$_2$OC(O)CH═CH$_2$, calculated to have 62.5 wt-% F. Other low refractive index perfluoropolyether mono-(meth)acrylate compounds that can be prepared in a similar manner are HFPO—C(O)NHCH$_2$CH$_2$OCH$_2$CH$_2$OCH$_2$CH$_2$OC(O)CH═CH$_2$ calculated to have 59.1 wt-% F, HFPO—C(O)NH(CH$_2$)$_6$OC(O)CH═CH$_2$ calculated to have 60.2 wt-% F, and HFPOC(O)NHCH$_2$CH$_2$OCH$_2$CH$_2$OCH$_2$CH$_2$OCH$_2$CH$_2$OC(O)CH═CH$_2$ calculated to have 57.3 wt-% F. Such compounds are described in U.S. patent application Ser. No. 11/277,162 filed Mar. 22, 2006 (See preparations 31a-31d).

The low refractive index layer as well as the fluoro(meth)acrylate polymeric intermediate typically comprises at least one crosslinker having three or more (meth)acrylate groups. This component is often a non-fluorinated multi-(meth)acrylate monomer.

Suitable monomers include for example trimethylolpropane triacrylate (commercially available from Sartomer Company, Exton, Pa. under the trade designation "SR351") ethoxylated trimethylolpropane triacrylate (commercially available from Sartomer Company, Exton, Pa. under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494") dipentaerythritol hexaacrylate, and tris(2-hydroxy ethyl) isocyanurate triacrylate (from Sartomer under the trade designation "SR368"). In some aspects, a hydantoin moiety-containing multi-(meth)acrylates compound, such as described in U.S. Pat. No. 4,262,072 (Wendling et al.) is employed.

The low refractive index layer as well as the fluoro(meth)acrylate polymeric intermediate may be prepared from at least one difunctional (meth)acrylate monomer. Various difunctional (meth)acrylate monomers are known in the art, including for example 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, neopentyl glycol diacrylate, polyethylene glycol diacrylate, (Mn=200 g/mole, 400 g/mole, 600 g/mole), propoxylated neopentyl glycol diacrylate, tetraethylene glycol diacrylate, tricyclodecanedimethanol diacrylate, triethylene glycol diacrylate, and tripropylene glycol diacrylate.

Small concentrations of oligomeric (meth)acrylate compounds such as for example, urethane acrylates, polyester acrylates, epoxy acrylates, and combinations thereof may optionally be employed in ii) or B).

Figure 4:
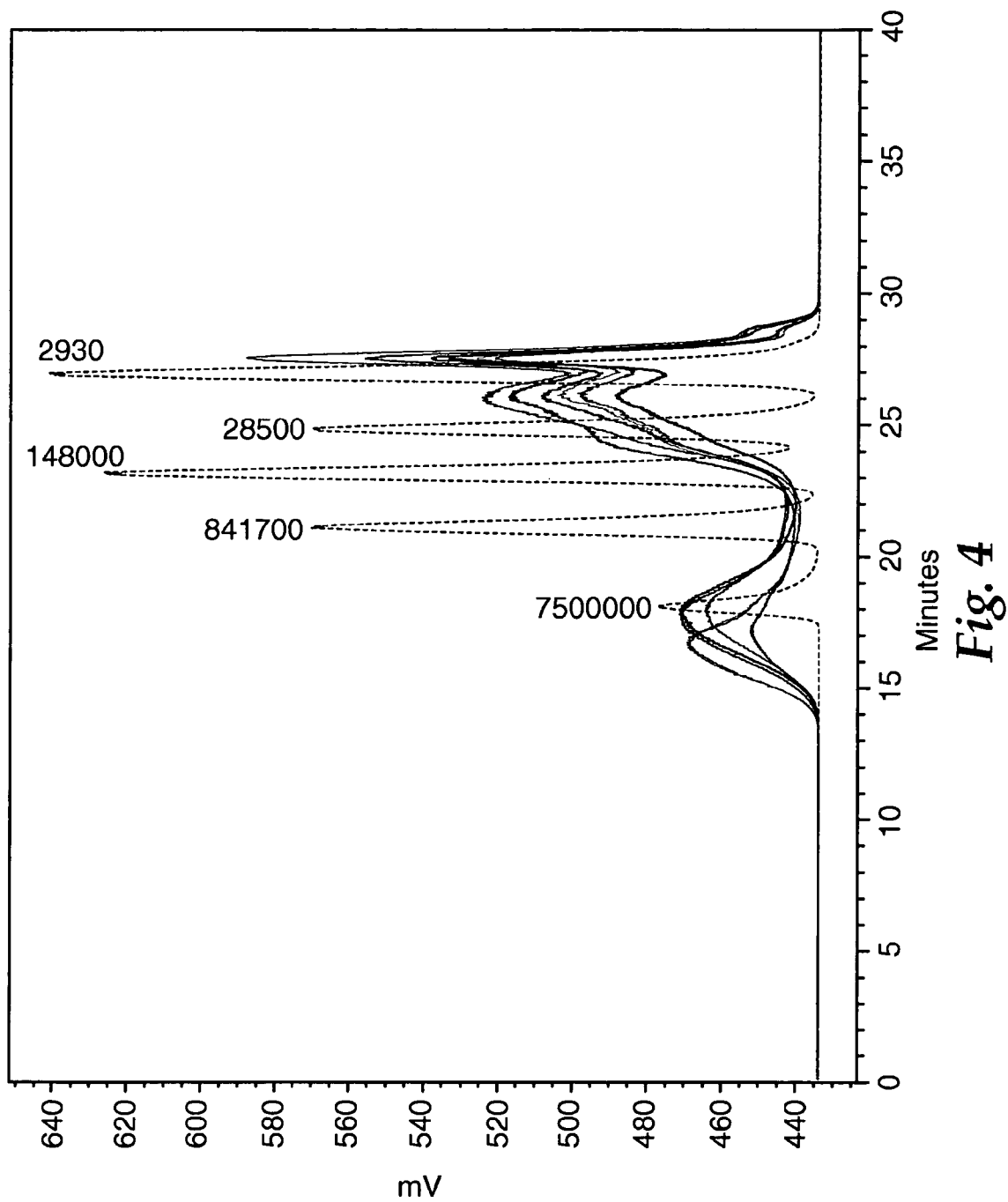
FIG. 4 are Gel Phase/Size Exclusion Chromatographs of six illustrative solutions comprising fluoro(meth)acrylate polymeric intermediates as described herein.

The free-radically polymerizable fluorinated polymer (e.g. intermediate) can be characterized by various known analytical techniques. FIG. 4 depicts the polystyrene equivalent molecular weight chromatographs of six illustrative fluoro(meth)acrylate polymer (e.g. intermediate) solutions as obtained from Gel Phase Chromatography/Size Exclusion Chromatography (GPC) according to the test method described in the examples. Each of the samples were prepared in accordance with the description of "Fluoroacrylate Polymer Intermediate 1" as set forth in the examples. The polystyrene equivalent molecular weights of each of the samples are report in Table 2 as follows:

TABLE 2

| Sample | Peak Retention Time (min) | Mw | Mn | Mz | Polydispersity | Mp |
| --- | --- | --- | --- | --- | --- | --- |
| 1 | 14-22 | 11,135,069 | 3,203,853 | 23,673,921 | 3.48 | 8,280,981 |
|   | 22-27 | 35,425 | 10,082 | 129,254 | 3.51 | 8,213 |
|   | 27-30 | 1,372 | 997 | 1,651 | 1.38 | 1,390 |
| 2 | 14-22 | 12,794,332 | 3,955,764 | 25,887,587 | 3.23 | 9,044,969 |
|   | 22-27 | 39,575 | 10,136 | 152,003 | 3.90 | 7,540 |
|   | 27-30 | 1,375 | 981 | 1,665 | 1.40 | 1,437 |
| 3 | 14-22 | 11,922,653 | 3,973,131 | 23,518,222 | 3.00 | 8,409,768 |
|   | 22-27 | 38,352 | 10,662 | 138,138 | 3.60 | 7,489 |
|   | 27-30 | 1,342 | 892 | 1,695 | 1.50 | 1,413 |
| 4 | 14-22 | 14,114,940 | 4,716,232 | 26,461,984 | 2.99 | 13,625,233 |
|   | 22-27 | 48,188 | 10,516 | 218,566 | 4.58 | 7,896 |
|   | 27-30 | 1,381 | 1,016 | 1,627 | 1.36 | 1,416 |
| 5 | 14-22 | 19,075,776 | 6,662,354 | 32,032,779 | 2.86 | 18,111,414 |
|   | 22-27 | 45,519 | 9,929 | 206,016 | 4.58 | 7,304 |
|   | 27-30 | 1,363 | 983 | 1,619 | 1.39 | 1,449 |

TABLE 2-continued

| Sample | Peak Retention Time (min) | Mw | Mn | Mz | Polydispersity | Mp |
|---|---|---|---|---|---|---|
| 6 | 14-22 | 18,940,570 | 5,983,265 | 32,631,315 | 3.17 | 19,355,440 |
|   | 22-27 | 41,766 | 10,434 | 166,225 | 4.00 | 6,764 |
|   | 27-30 | 1,431 | 1,029 | 1,712 | 1.39 | 1,440 |

As shown in by Table 2 and FIG. 4, the reaction product mixture has at least a bimodal molecular weight distribution. The broad peak at retention times of about 14 to 22 minutes, corresponding to a Mw of about 10 to 20 million g/mole relative to polystyrene standards, is attributed to the hyperbranched polymer. The peak at a retention times of about 22 to 27 minutes, having a polystyrene equivalent Mw of about 30,000 to 50,000 g/mole, is attributed to oligomeric components composed of about a stoichiometric ratios of the monomers (i.e. C6DIACRYL, CN 4000 and SR399 for this particular exemplified composition). The peak at retention times of about 27 to 30 minutes corresponds to the molecular weight of one of the high fluorine containing multi-functional free-radically polymerizable materials (i.e. CN4000, having a molecular weight of about 1,300 g/mole).

Although polystyrene standards are not believed to be the most suitable standards for this type of polymer, the results do show that the free-radically polymerizable materials have in fact polymerized. Based on this GPC analysis, it can be concluded that the fluoro (meth)acrylate polymer (e.g. intermediate) solution can comprise at least 10 wt-%, 20 wt-%, or 30 wt-% of polymerized products having a polystyrene equivalent Mw of greater than 1,000,000 g/mole. The reaction product solution can also comprise at least 10 wt-%, 20 wt-%, 30 wt-%, or 40 wt-% of polymerized products having a polystyrene equivalent Mw of at least 5,000 to 1,000,000 g/mole. The reaction product solution may also comprises at least 10 wt-% or 20 wt-% of unreacted or partially reacted starting materials, typically having a polystyrene equivalent Mw of at less than 5,000 g/mole or lower depending on the molecular weight of the monomeric and oligomeric starting material.

The detailed structure of this polymer may be characterized using various other analytical techniques including Low-Angle Laser Light Scattering (LALLS), Solution Viscosity Measurements, DSC Measurements, and Dynamic Mechanical Experiments.

In some cases, a portion of an initially polydisperse multi (meth)acrylate polymer product may be fractionated with methanol/THF or other appropriate counter-solvent/solvent mixtures, resulting in several fractions of moderate polydispersity. Further, in order to conduct some of these characterizations, it may be necessary for any remaining double bonds to be reacted (e.g. with Michael-adduct amines or silane derivations) to prevent further crosslinking of the isolated product. The literature reports analyses of "microgel" model systems incorporating monofunctional reactive species are more easily handled than pure multifunctional acrylate microgels. Furthermore, the dynamic mechanical measurements in the melt are often performed only with copolymers containing monofunctional monomers. It has been reported that systems with 5-20% monofunctional monomers copolymerized with difunctional monomers exhibit most of the characteristics of the pure multifunctional-sourced microgels and provide a lower glass transition and a better solubility, but do not drastically change the product properties in terms of classical physio-chemical analysis.

At least one free-radical initiator is typically utilized for the preparation of the fluoro(meth)acrylate polymeric intermediate as well for the preparation of the low refractive index coating composition. Useful free-radical thermal initiators include, for example, azo, peroxide, persulfate, and redox initiators, and combinations thereof. Useful free-radical photoinitiators include, for example, those known as useful in the UV cure of acrylate polymers. In some aspects the fluoro (meth)acrylate polymer (e.g. intermediate) is solution polymerized by use of a thermal initiator whereas the intermediate (i.e. A) is photopolymerized with B). In addition, other additives may be added to the final composition. These include but are not limited to resinous flow aids, photostabilizers, high boiling point solvents, and other compatibilizers well known to those of skill in the art.

The fluoro (meth)acrylate polymer (e.g. intermediate) can be formed, dissolved, or dispersed, in a compatible (e.g. non-fluorinated) organic solvent. The fluoro (meth)acrylate polymer intermediate is typically present at concentration of at least 5 wt-% solids. In some embodiments, the fluoro (meth)acrylate polymer intermediate is present at a concentration of at least about 10 wt-%. At concentrations of about 15 wt-%, the composition may gel. It is typically preferred that the concentration of fluoro (meth)acrylate polymer approaches, yet is less than, the concentration that causes a gel transition in order to maximize molecular weight of the fluoro (meth) acrylate polymer.

A single organic solvent or a blend of solvents can be employed in the preparation of the fluoro (meth)acrylate polymer (e.g. intermediate) and low refractive index composition. Depending on the free-radically polymerizable materials employed, suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; aromatic hydrocarbons such as toluene; isophorone; butyrolactone; N-methylpyrrolidone; tetrahydrofuran; esters such as lactates, acetates, including propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

The fluoro (meth)acrylate polymer intermediate as well as the combination of A) and B) form a compatible coating, preferably in the absence of fluorinated solvents. Although various fluorinated solvents could be employed, in one aspect the compositions are free of fluorinated solvents. Compatible coating compositions are clear, rather than hazy. Compatible coatings are substantially free of visual defects. Visual defects that may be observed when incompatible coating are employed include but are not limited to haze, pock marks, fisheyes, mottle, lumps or substantial waviness, or other visual indicators known to one of ordinary skill in the art in the optics and coating fields.

The fluoro(meth)acrylate polymer solution can be combined with B, and a photoinitiator, optionally diluting the mixture to about 1 to 10 percent solids with additional solvent.

The method of forming an optical display or an antireflective film for use of an optical display may include providing a light transmissible substrate layer; providing a high refractive index material on the substrate layer; and providing the low index layer described herein coupled to the high refractive index layer. The low index layer may be provided by applying a layer of said low refractive index material onto said (e.g. partially cured) high refractive index material and irradiating with a sufficient ultraviolet radiation to crosslink. Alternatively, the low refractive index coating may be applied to a release liner, at least partially cured, and transfer coated. Further, the antireflection material may be applied directly to the substrate or alternatively applied to a release layer of a transferable antireflection film and subsequently transferred from the release layer to the substrate using a thermal transfer or photoradiation application technique.

The low refractive index composition and high refractive index composition can be applied as a single or multiple layers to a high refractive index layer or directly to a (e.g. display surface or film) substrate using conventional film application techniques. Alternatively, the low refractive index coating may be applied to a release liner or substrate, at least partially cured, and transfer coated using a thermal transfer or photoradiation application technique. Although it is usually convenient for the substrate to be in the form of a roll of continuous web, the coatings may be applied to individual sheets.

Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, *Modern Coating and Drying Technology*, VCH Publishers, NY 1992, ISBN 3-527-28246-7 and Gutoff and Cohen, *Coating and Drying Defects: Troubleshooting Operating Problems*, Wiley Interscience, NY ISBN 0-471-59810-0.

The low refractive index coating as well as high refractive index coating composition are dried to remove the solvent and then cured for example by exposure to ultraviolet radiation (e.g. using an H-bulb or other lamp) at a desired wavelength, preferably in an inert atmosphere (less than 50 parts per million oxygen) or an electron beam. The reaction mechanism causes the fluoro(meth)acrylate polymeric intermediate of A) and B) to crosslink. Such crosslinking is surmised to result in a fluoro(meth)acrylate polymer phase and a (meth) acrylate phase (i.e. of B) to substantially entangle, therein forming an interpenetrating polymer network, or IPN.

The fluorinated component(s) of the low refractive index layer provide low surface energy. The surface energy of the low index coating composition can be characterized by various methods such as contact angle and ink repellency. The static contact angle with water of the cured low refractive index layer is typically at least 80°. More preferably, the contact angle is at least 90° and most preferably at least 100°. Alternatively, or in addition thereto, the advancing contact angle with hexadecane is at least 50° and more preferably at least 60°. Low surface energy is amenable to anti-soiling and stain repellent properties as well as rendering the exposed surface easy to clean.

The low refractive index composition described herein is amenable to providing a durable low refractive index layer and antireflective films. In one aspect, the durable low refractive index layer or antireflective film are free of scratches visible to the eye after 10 wipes, 50 wipes, 100 wipes, 200 wipes, and even 300 wipes with steel wool using a 3.2 cm diameter mandrel and a mass of 500 grams or 1 kg as measured according to the Steel Wool Durability Test, described in further detail in the examples.

Surface layers that resist visible scratching do not necessarily retain their low surface energy. In preferred embodiments, the durable low refractive index layers and durable antireflective films retain low surface energy after repeated contact with an abrasive material such as steel wool. The low refractive index layer and antireflective film preferably exhibits substantially the same ink repellency or a static contact angle with water of at least 90°, 95°, or 100° after various wipes according to the Steel Wool Durability Test.

In some embodiments, durable antireflective film include the low refractive index layer prepared from the free-radically polymerizable polymeric intermediate as described herein in combination with a high refractive index layer that consists of a (e.g. single) thin layer of an inorganic material, such as a metal or metal oxide. Such high refractive index coatings are generally deposited by sol-gel coating methods, thermal evaporation, sputtering, or other vacuum deposition techniques. Examples of particular metal oxides include for example oxides of aluminum, silicon, tin, titanium, niobium, zinc, zirconium, tantalum, yttrium, cerium, tungsten, bismuth, indium, and mixtures thereof.

Durable low refractive index layer preferably comprises (e.g. surface modified) particles preferably having a low refractive index (e.g. less than 1.50) dispersed in the free-radically polymerized fluoro-organic material described herein. Various low refractive index inorganic oxides particles are known such as nitrides, sulfide and halides (e.g. fluorides). Preferred low refractive index particle include colloidal silica, magnesium fluoride, and lithium fluoride. Silicas for use in the low refractive index composition are commercially available from Nalco Chemical Co., Naperville, Ill. under the trade designation "Nalco Collodial Silicas" such as products 1040, 1042, 1050, 1060, 2327 and 2329. Suitable fumed silicas include for example, products commercially available from DeGussa AG, (Hanau, Germany) under the trade designation, "Aerosil series OX-50", as well as product numbers-130, -150, and -200. Fumed silicas are also commercially available from Cabot Corp., Tuscola, I, under the trade designations CAB-O-SPERSE 2095", "CAB-O-SPERSE A105", and "CAB-O-SIL M5".

The high refractive index layer of the durable antireflective film preferably comprises (e.g. surface modified) particles preferably having a high refractive index (e.g. at least 1.60) dispersed in a crosslinked organic material. A variety of (e.g. non-fluorinated) free-radically polymerizable monomers, oligomers, polymers, and mixtures thereof can be employed in the organic material of the high refractive index layer. Preferably the organic material of high refractive index layer comprises a non-fluorinated free-radically polymerizable material having three or more (meth)acrylate groups alone or in combination with non-fluorinated monofunctional and/or difunctional materials, such as those previously described with respect to the low refractive index layer. Various suitable high refractive index compositions are known such as described in Pending U.S. Application Publication Nos.

2006-0147702; 2006-0147703; 2006/0147674; all filed Dec. 30, 2004, and PCT Application Nos. WO2006/073755; WO2006/073856 and WO2006/073773.

Various high refractive index particles are known including for example zirconia ("$ZrO_2$"), titania ("$TiO_2$"), antimony oxides, alumina, and tin oxides, alone or in combination. Zirconias for use in the high refractive index layer are available from Nalco Chemical Co. under the trade designation "Nalco OOSSOO8" and from Buhler AG Uzwil, Switzerland under the trade designation "Buhler zirconia Z-WO sol". Zirconia nanoparticle can also be prepared such as described in U.S. Patent Application Publication No. 2006/0148950 filed Dec. 30, 2004 and U.S. Pat. No. 6,376,590.

The concentration of (e.g. inorganic) particles in the low refractive index layer and/or the high refractive index layer is typically at least 5 vol-%, and preferably at least 15 vol-%. The concentration of inorganic particle is typically no greater than about 50 vol-%, and more preferably no greater than 40 vol-%.

The inorganic nanoparticles are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such particle size, particle type, modifier molecular wt, and modifier type. In general it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl)methoxyethoxyethyl carbamate, N-(3-triethoxysilylpropyl)methoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy)propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

The surface modification of the particles in the colloidal dispersion can be accomplished in a variety known ways, such as described in previously cited U.S. Patent Application Publication No. 2006-0148950 filed Dec. 30, 2004 and U.S. Pat. No. 6,376,590.

A combination of surface modifying agents can be useful, wherein at least one of the agents has a functional group co-polymerizable with a hardenable resin. Combinations of surface modifying agent can result in lower viscosity. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

A preferred combination of surface modifying agent includes at least one surface modifying agent having a functional group that is copolymerizable with the organic component of the polymerizable resin and a second modifying agent different than the first modifying agent. The second modifying agent is preferably a polyalkyleneoxide containing modifying agent that is optionally co-polymerizable with the organic component of the polymerizable composition.

Surface modified colloidal nanoparticles can be substantially fully condensed. Non-silica containing fully condensed nanoparticles typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

The inorganic particles preferably have a substantially monodisperse size distribution or a polymodal distribution obtained by blending two or more substantially monodisperse distributions. Alternatively, the inorganic particles can be introduced having a range of particle sizes obtained by grinding the particles to a desired size range. The inorganic oxide particles are typically non-aggregated (substantially discrete), as aggregation can result in optical scattering (haze) or precipitation of the inorganic oxide particles or gelation. The inorganic oxide particles are typically colloidal in size, having an average particle diameter of 5 nanometers to 100 nanometers. The particle size of the high index inorganic particles is preferably less than about 50 nm in order to have sufficiently transparent. The average particle size of the inorganic oxide particles can be measured using transmission electron microscopy to count the number of inorganic oxide particles of a given diameter.

The low refractive index layer or antireflective film can provide a gloss or matte surface. For example, the surface can be roughened or textured to provide a matte surface. This can be accomplished in a variety of ways as known in the art including embossing the low refractive index surface with a suitable tool that has been bead-blasted or otherwise roughened, as well as by curing the composition against a suitable roughened master as described in U.S. Pat. No. 5,175,030 (Lu et al.) and U.S. Pat. No. 5,183,597 (Lu).

Matte low and high refractive index coatings can also be prepared by adding a suitably sized particle filler such as silica sand or glass beads to the composition. Such matte particles are typically substantially larger than the surface modified low refractive index particles. For example the average particle size typically ranges from about 1 to 10 microns. The concentration of such matte particles may range from at least 2 wt-% to about 10 wt-% or greater. At concentrations of less than 2 wt-% (e.g. 1.8 wt-%, 1.6 wt-%, 1.4 wt-%, 1.2 wt-%, 1.0 wt-%, 0.8 wt-%, 0.6 wt-%, the concentration is typically insufficient to produce the desired reduction in gloss (i.e. haze).

In yet another aspect, matte antireflective films can be prepared by providing the high refractive index layer and low refractive index (e.g. surface) layer on a matte film substrate. Exemplary matte films are commercially available from U.S.A. Kimoto Tech, Cedartown, Ga. under the trade designation "N4D2A The (e.g. display) articles described herein, comprised of transparent substrates, typically have a transmission of at least 80%, at least 85% and preferably at least 90%. Further, the haze is typically less than 5%, preferably less than 2%, and more preferably less than 1.0% or even 0.8%. In preferred embodiments, the haze is less than 1.0% after 25 wipes with a weight of 1 kg according to the Steel Wool Durability Test. Further, gloss surfaces typically have a gloss of at least than 130 as measured according to ASTM D 2457-03 at 60°.

Matte antireflective films typically have lower transmission and higher haze values than typical gloss films. For example the haze is generally at least 5%, 6%, 7%, 8%, 9%, or 10% as measured according to ASTM D1003. Whereas gloss surfaces typically have a haze of less than 5%, 4% or 3%.

Referring now to FIG. 1, a perspective view of an article (here a computer monitor 10) having an optical display 12 coupled within a housing 14. The optical display 12 is a substantially transparent material through which a user can view text, graphics or other displayed information.

In the case of display panels, the display substrate 12 is light transmissive, meaning light can be transmitted through the display substrate 12 such that the display can be viewed. Both transparent (e.g. gloss) and matte light transmissive substrates 12 are employed in display panels. The display substrate 12 may comprise or consist of any of a wide variety of non-polymeric materials, such as glass, or various thermoplastic and crosslinked polymeric materials, such as polyethylene terephthalate (PET), (e.g. bisphenol A) polycarbonate, cellulose acetate, poly(methyl methacrylate), and polyolefins such as biaxially oriented polypropylene which are commonly used in various optical devices.

Figure 2:
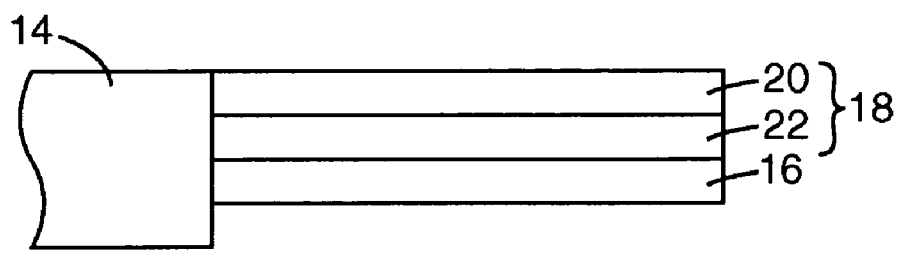
FIG. 2 is a sectional view of the article of FIG. 1 taken along line 2-2 illustrating an embodied antireflective film having a low refractive index layer.

With reference to FIG. 2, the optical display 12 includes an antireflection film 18 having at least one layer of a high refractive index layer 22 and a low refractive index layer 20. The low refractive index layer 20 is provided between the high refractive index layer and the viewing surface. Low refractive index layer 20 is typically a surface layer exposed to the environment, as depicted in FIG. 2.

The high refractive index layer has a refractive index of at least about 1.4, and typically at least about 1.50, or 1.55, or 1.60 or greater. The maximum refractive index of the high index layer is typically no greater than about 1.75 for coatings having high refractive index inorganic particles dispersed in a crosslinked organic material. The low refractive index layer has a refractive index less than a high refractive index layer. The difference in refractive index between the high refractive index layer and low refractive index layer is typically at least 0.10, or 0.15, or 0.2 or greater. The low refractive index layer typically has a refractive index of less than about 1.5, or less than about 1.47, or less than about 1.45, or less than about 1.42. The minimum refractive index of the low index layer is generally at least about 1.35.

Antireflective films preferably have an average reflectance of less than 3% or 2% at 450 nm to 650 nm as measured with a spectrophotometer (model UV-3101 PC with MPC-3100 attachment) equipped with a 50 mm diameter integration sphere available from Shimadzu Scientific Instruments, Columbia, Md. using a 12 degree off axis geometry to measure specular reflection.

Figure 3:
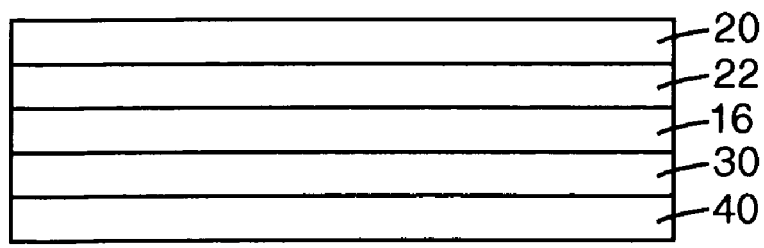
FIG. 3 is an embodied antireflective film article.

With reference to FIG. 3, an embodied antireflective film article typically comprises a light transmissive substrate 16. The high refractive index layer 22 is disposed between the film substrate 16 and low refractive index layer 20.

As an alternative to an antireflective film, low refractive index layer 20 may be employed alone as a protective surface layer. In such embodiment, low index layer 20 may be coupled directly to optical substrate 12 or film substrate 16 without a high refractive index layer.

In one aspect, the antireflective film comprises a relatively thick high refractive index layer in combination with a relatively thin low refractive index layer. The high refractive index layer typically has a thickness of at least 0.5 microns, preferably at least 1 micron, more preferably at least 2 micron and typically no greater than 10 microns. The low refractive index layer has a thickness of less than 0.5 microns and preferably less than 0.2 microns (i.e. 200 nanometers). This embodiment can provide a durable antireflective film while being free of additional hardcoat layers.

In yet another embodiments, both the low refractive index layer and high refractive index layer may be relatively thin, each layer being at least about 50 nm and less than 0.5 microns (e.g. less than 0.2 microns). For this embodiment as well as for embodiments wherein the low refractive index layer and/or high refractive index layer lack the inclusion of surface modified inorganic particles, the antireflective film article preferably comprises a hardcoat layer. The hardcoat layer preferably contains (e.g. surface modified) nanometer-sized inorganic oxide particles dispersed in a binder matrix. Typically the hardcoat is formed by coating a curable liquid ceramer composition onto the substrate and curing the composition in situ to form a hardened film. Suitable coating methods include those previously described for application of the fluorochemical surface layer. Further details concerning hardcoats can be found in U.S. Pat. No. 6,132,861 (Kang et al. '861), U.S. Pat. No. 6,238,798 B1 (Kang et al. '798), U.S. Pat. No. 6,245,833 B1 (Kang et al. '833) and U.S. Pat. No. 6,299, 799 (Craig et al. '799).

For embodiments wherein the (e.g. durable) low refractive index layer is employed independently, the low refractive index layer may be substantially thicker, e.g. up to about 10 microns.

The hardcoat layer is typically provided between the substrate and the high refractive index layer or between the substrate and low refractive index layer for embodiments wherein the low refractive index layer is employed independently. When present, the thickness of the hardcoat layer is typically at least 0.5 microns, preferably at least 1 micron, and more preferably at least 2 microns. The thickness of the hardcoat layer is generally no greater than 25 microns. Preferably the thickness ranges from 3 microns to 5 microns.

The antireflective film may comprise other layers. Various permanent and removable adhesive compositions 30 may be provided on the opposite side of the film substrate 16. For embodiments that employ pressure sensitive adhesive, the antireflective film article typically include a removable release liner 40. During application to a display surface, the release liner is removed so the antireflective film article can be adhered to the display surface.

Suitable adhesive compositions include (e.g. hydrogenated) block copolymers such as those commercially available from Kraton Polymers, Westhollow, Tex. under the trade designation "Kraton G-1657", as well as other (e.g. similar) thermoplastic rubbers. Other exemplary adhesives include acrylic-based, urethane-based, silicone-based and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

The antireflective film substrate 16 is selected based in part on the desired optical and mechanical properties such as flexibility, dimensional stability and impact resistance. Substrate 16 may comprise any of the same thermoplastic and crosslinked polymeric materials as optical display 12. Substrate 16 may also comprise or consist of polyamides, polyimides, phenolic resins, polystyrene, styrene-acrylonitrile copolymers, epoxies, and the like. In addition, the substrate 16 may comprise a hybrid material, having both organic and inorganic components. The film substrate 16 thickness typically also will depend on the intended use. For most applications, a substrate thickness of less than about 0.5 mm is preferred, with about 0.02 to about 0.2 mm being more preferred. Self-supporting polymeric films are preferred. The polymeric material can be formed into a film using conventional filmmaking techniques such as by extrusion and optional uniaxial or biaxial orientation of the extruded film. The substrate can be treated to improve adhesion between the substrate and the adjacent layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

Various light transmissive optical films suitable for use as the film substrate are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150, Jan. 29, 2004.

As described in U.S. Patent Application 2003/0217806 multilayer optical films provide desirable transmission and/or reflection properties at least partially by an arrangement of microlayers of differing refractive index. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 μm. However, thicker layers can also be included, such as skin layers at the outer surfaces of the film, or protective boundary layers disposed within the film that separate packets of microlayers. Multilayer optical film bodies can also comprise one or more thick adhesive layers to bond two or more sheets of multilayer optical film in a laminate.

The reflective and transmissive properties of multilayer optical film body are a function of the refractive indices of the respective microlayers. Each microlayer can be characterized at least at localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes. In practice, the refractive indices are controlled by judicious materials selection and processing conditions. Films can be made by co-extrusion of typically tens or hundreds of layers of two alternating polymers A, B, followed by optionally passing the multilayer extrudate through one or more multiplication die, and then stretching or otherwise orienting the extrudate to form a final film. The resulting film is composed of typically tens or hundreds of individual microlayers whose thicknesses and refractive indices are tailored to provide one or more reflection bands in desired region(s) of the spectrum, such as in the visible or near infrared. In order to achieve high reflectivities with a reasonable number of layers, adjacent microlayers preferably exhibit a difference in refractive index ($\delta\ n_x$) for light polarized along the x-axis of at least 0.05. If the high reflectivity is desired for two orthogonal polarizations, then the adjacent microlayers also preferably exhibit a difference in refractive index ($\delta\ n_y$) for light polarized along the y-axis of at least 0.05. Otherwise, the refractive index difference can be less than 0.05 and preferably about 0 to produce a multilayer stack that reflects normally incident light of one polarization state and transmits normally incident light of an orthogonal polarization state. If desired, the refractive index difference ($\delta\ n_z$) between adjacent microlayers for light polarized along the z-axis can also be tailored to achieve desirable reflectivity properties for the p-polarization component of obliquely incident light.

Exemplary materials that can be used in the fabrication of polymeric multilayer optical film can be found in PCT Publication WO 99/36248 (Neavin et al.). Desirably, at least one of the materials is a polymer with a stress optical coefficient having a large absolute value. In other words, the polymer preferably develops a large birefringence (at least about 0.05, more preferably at least about 0.1 or even 0.2) when stretched. Depending on the application of the multilayer film, the birefringence can be developed between two orthogonal directions in the plane of the film, between one or more in-plane directions and the direction perpendicular to the film plane, or a combination of these. In special cases where isotropic refractive indices between unstretched polymer layers are widely separated, the preference for large birefringence in at least one of the polymers can be relaxed, although birefringence is still often desirable. Such special cases may arise in the selection of polymers for mirror films and for polarizer films formed using a biaxial process, which draws the film in two orthogonal in-plane directions. Further, the polymer desirably is capable of maintaining birefringence after stretching, so that the desired optical properties are imparted to the finished film. A second polymer can be chosen for other layers of the multilayer film so that in the finished film the refractive index of the second polymer, in at least one direction, differs significantly from the index of refraction of the first polymer in the same direction. For convenience, the films can be fabricated using only two distinct polymer materials, and interleaving those materials during the extrusion process to produce alternating layers A, B, A, B, etc. Interleaving only two distinct polymer materials is not required, however. Instead, each layer of a multilayer optical film can be composed of a unique material or blend not found elsewhere in the film. Preferably, polymers being coextruded have the same or similar melt temperatures.

Exemplary two-polymer combinations that provide both adequate refractive index differences and adequate interlayer adhesion include: (1) for polarizing multilayer optical film made using a process with predominantly uniaxial stretching, PEN/coPEN, PET/coPET, PEN/sPS, PET/sPS, PEN/Eastar™ and PET/Eastar™ where "PEN" refers to polyethylene naphthalate, "coPEN" refers to a copolymer or blend based upon naphthalene dicarboxylic acid, "PET" refers to polyethylene terephthalate, "coPET" refers to a copolymer or blend based upon terephthalic acid, "sPS" refers to syndiotactic polystyrene and its derivatives, and Eastar™ is a polyester or copolyester (believed to comprise cyclohexanedimethylene diol units and terephthalate units) commercially available from Eastman Chemical Co.; (2) for polarizing multilayer optical film made by manipulating the process conditions of a biaxial stretching process, PEN/coPEN, PEN/PET, PEN/PBT, PEN/PETG and PEN/PET-coPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol; (3) for mirror films (including colored mirror films), PEN/PMMA, coPEN/PMMA, PET/PMMA, PEN/Ecdel™, PET/Ecdel™, PEN/sPS, PET/sPS, PEN/coPET, PEN/PETG, and PEN/THV™, where "PMMA" refers to polymethyl methacrylate, Ecdel™ is a thermoplastic polyester or copolyester (believed to comprise cyclohexanedicarboxylate units, polytetramethylene ether glycol units, and cyclohexanedimethanol units) commercially available from Eastman Chemical Co., and THV™ is a fluoropolymer commercially available from 3M Company.

Further details of suitable multilayer optical films and related constructions can be found in U.S. Pat. No. 5,882,774 (Jonza et al.), and PCT Publications WO 95/17303 (Ouderkirk et al.) and WO 99/39224 (Ouderkirk et al.). Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

In order to reduce or eliminate optical fringing within the high refractive index layer it is preferred that the antireflective film substrate has a refractive index close to that of the (e.g. thick) high refractive index layer, i.e. differs from the high refractive index layer by less than 0.05, and more preferably less than 0.02. Alternatively, optical fringing can be eliminated or reduced by providing a high index primer on the film substrate, the primer being chosen to closely match the refractive index of the high refractive index layer.

In one embodiment, a high refractive index primer coating is applied to either the display substrate surface or film substrate at a thickness for example ranging from about 20 nm to 80 nm. A hardcoat layer or more preferably a durable high refractive index layer is then applied to the primed surface of the substrate. When coated on a film substrate such as PET, it yields a high-refractive index coating (e.g. RI~1.67) that closely matches the refractive index of the high-index hardcoat applied as the next layer. This helps to reduce interference fringing such as that due to index mismatches with a conventional acrylate primer.

Suitable high refractive index primers can be prepared from compositions having a (e.g. high concentration) of high refractive index inorganic nanoparticles. For example, one suitable primer composition may comprise about 80 wt-% surface modified high refractive index particles in combination with about 20 wt-% of an (e.g. acrylic) polymeric binder. Another preferred primer coating material for use in these constructions is available from Sumitomo Osaka Cement Under the trade designation "Sumicefine TM-AS-1". This material is an aqueous dispersion containing conductive antimony tin oxide nanoparticles and a polyester binder. This coating also helps to improve adhesion of the high-index hardcoat to the PET substrate film, relative to uncoated PET film. Finally, the antimony tin oxide nanoparticles provide good antistatic performance (static charge decay times 0.01-0.02 sec) after application of the high-index hardcoat.

In yet other embodiments, optical fringing can be eliminated or reduced by roughening the substrate to which a hardcoat or durable high refractive index layer is applied. The substrate surface may be roughened for example with 9 micron to 30 micron microabrasives.

The low refractive index coating and antireflective film described herein are suitable for application to optical displays ("displays"). The displays include various illuminated and non-illuminated displays panels. Such displays include multi-character and especially multi-line multi-character displays such as liquid crystal displays ("LCDs"), plasma displays, front and rear projection displays, cathode ray tubes ("CRTs"), signage, as well as single-character or binary displays such as light emitting tubes ("LEDs"), signal lamps and switches.

The low refractive index coating and antireflective film can be employed with a variety of portable and non-portable information display articles. These articles include, but are not limited to, PDAs, LCD-TV's (both edge-lit and direct-11t), cell phones (including combination PDA/cell phones), touch sensitive screens, wrist watches, car navigation systems, global positioning systems, depth finders, calculators, electronic books, CD and DVD players, projection televisions screens, computer monitors, notebook computer displays, instrument gauges, and instrument panel covers. These devices can have planar or curved viewing faces.

The antireflective material, can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, eyeglasses, overhead projectors, stereo cabinet doors, stereo covers, watch covers, as well as optical and magneto-optical recording disks, and the like.

The low refractive index coating may also be applied to a variety of other articles including (e.g. retroreflective) signage and commercial graphic display films employed for various advertising, promotional, and corporate identity uses.

While the invention has been described in terms of preferred embodiments, it will be understood, of course, that the invention is not limited thereto since modifications may be made by those skilled in the art, particularly in light of the foregoing teachings.

Analytical Test Methods for Fluoroacrylate Polymer Characterization

1. Gel Phase Chromatography/Size Exclusion Chromatography—Approximately 500 mg of solution of the 10% polymer reaction solution was weighed and diluted in 10.0 ml of THF. The solutions were passed through a 0.45 micron syringe filter and analyzed by GPC-SEC. The SEC system was operated under the following conditions:

| | |
|---|---|
| Sample: | 100 μL Injection @ 5 mg/mL Tetrahydrofuran Sample filtered through 0.45 micron PTFE membrane |
| Mobile Phase: | Tetrahydrofuran-UV Grade, uninhibited; Burdick & Jackson or equivalent grade |
| Flow Rate: | 1.0 mL/min |
| System: | Waters EMD |
| Detector: | ACS 950/14 Mass Detector; 40° C. |
| Columns: | 2 PL-Gel Mixed-B (nominal MW range 500-1.00$^7$ Daltons), 1 Styragel HMW-7 (nominal MW range 5.00e5-1.00e8 Daltons), all are 300 × 7.8 mm |
| Standards: | EasyCal PS-1 contains 5 polystyrene standards having nominal Mp ranging from 7,500,000 to 3,000 Daltons. |

The EasyCal calibration standard was prepared and injected into our GPC, in sequence with the fluoropolymer samples. A third order polynomial equation was fitted to the retention times of the standard, and used to calibrate the molecular weight versus retention time of our samples.

Ingredients Employed in the Examples

"HFPO—", as used in the Examples, unless otherwise noted, refers to the end group F(CF(CF3)CF2O)$_a$CF(CF3)- of the methyl ester F(CF(CF3)CF2O)$_a$CF(CF3)C(O)OCH3, wherein a averages about 6.22, with an average molecular weight of 1,211 g/mol. It was prepared according to the method reported in U.S. Pat. No. 3,250,808 (Moore et al.), with purification by fractional distillation.

HFPO—C(O)N(H)CH$_2$CH$_2$CH$_2$N(H)CH$_3$ was prepared according to the procedure found in US Published Application No. 2005/0250921 A1, Preparation FC1/AM1.

Multi-Functional Free-Radically Polymerizable Materials Having High Fluorine

1. HFPO-TMPTA refers to the Michael's adduct of HFPO—C(O)N(H)CH$_2$CH$_2$CH$_2$N(H)CH$_3$ (FC1/AM1) with trimethylolpropane triacrylate (TMPTA). This adduct was made as described in US Published Application No. 2005/0250921A1, Example 1, as the preparation of an approximately 1:1 molar ratio adduct of FC1/AM1 with AC-1 (TMPTA) or FC1/AM1/AC-1. This adduct has 52.02 wt-% fluorine and nominal Mn of 1563 g/mole.

2. C6DIACRY is the trade designation for 2,2,3,3,4,4,5,5-octafluoro-1,6-hexanediol diacrylate (commonly referred to as 8F-HDDA), having a molecular weight of 370.2 g/mole and at least 40 wt-% fluorine was obtained from Exfluor Research Corporation, of Round Rock, Texs.

3. CN 4000 is the trade designation for a perfluoropolyether acrylate oligomer reported by the supplier to have a refractive index of 1.341 obtained from Sartomer Company, Exton, Pa.

Darocur 1173 is the trade designation for 2-hydroxy-2-methyl-1-phenyl-1-propanone, a UV photoinitiator, and was obtained from Ciba Specialty Products, of Tarrytown, N.Y., and used as received.

Irgacure 184 is the trade designation for 1-hydroxy-cyclohexylphenyl ketone, and was obtained from CIBA Specialty Chemicals, of Tarrytown, N.Y.

Nalco 2327 is the trade designation for an aqueous dispersion of 20 nm silica nanoparticles (41% solids in water, stabilized with ammonia), and was obtained from Nalco Chem. Co., of Naperville, Ill.

Prostab 5198 is the trade designation for 4-hydroxy-2,2,6,6-tetramethyl-1-piperidinyloxy (commonly referred to as 4-hydroxy-TEMPO), and was obtained from CIBA Specialty Chemicals, of Tarrytown, N.Y.

3-methacryloxypropyltrimethoxysilane is available from Alfa Aesar, Ward Hill, Mass. (Stock #30505) and was used as received.

4-(aminomethyl)piperidine was obtained from Sigma-Aldrich, Milwaukee, Wis.

SR351 is the trade designation for trimethylolpropane triacrylate (TMPTA), and was obtained from Sartomer Company, of Exton, Pa.

SR399 is the trade designation for dipentaerythritol pentaacrylate (molecular weight of 525 g/mole), a non-fluorinated multifunctional (meth)acrylate monomer obtained from Sartomer Company, of Exton, Pa.

SR444C is the trade designation for pentaerythritol triacrylate (PET3A), a non-fluorinated multifunctional (meth)acrylate monomer obtained from Sartomer Company, of Exton, Pa.

Vazo 52 is the trade designation for 2,2',-azobis(2,4-dimethylpentane nitrile), a thermal free-radical initiator obtained from DuPont, of Wilmington, Deleware.

ZrO$_2$ sols (40.8% solids in water) were prepared in accordance with the procedures described in U.S. Patent Application Publication No. 2006/0204745 filed Mar. 14, 2005 that claims priority to U.S. patent application Ser. No. 11/078,468 filed Mar. 11, 2005. The resulting ZrO$_2$ sols were evaluated with Photo Correlation Spectroscopy (PCS), X-Ray Diffraction and Thermal Gravimetric Analysis as described in U.S. patent application Ser. Nos. 11/079,832 and 11/078,468. The ZrO$_2$ sols used in the examples had properties in the ranges that follow:

| | PCS Data | | | |
|---|---|---|---|---|
| Dispersion Index | Intensity avg size (nm) | Volume- avg size (nm) | (Intensity-avg)/ (Volume-avg) | |
| 1.0-2.4 | 23.0-37.0 | 8.0-18.8 | 1.84-2.97 | |

| Relative Intensities | | Apparent Crystallite Size (nm) | | | | Weighted | |
|---|---|---|---|---|---|---|---|
| Cubic/ Tetragonal | Monoclinic | (C, T) (1 1 1) | M (−1 1 1) | M (1 1 1) | Avg M Size | % C/T | Avg XRD Size |
| 100 | 6-12 | 7.0-8.5 | 3.0-6.0 | 4.0-11.0 | 4.5-8.3 | 89%-94% | 7.0-8.4 |

Surface Modified Zirconia Nanoparticles 20.4 lbs of an aqueous dispersion of 10 nm zirconia nanoparticles (40.8% solids in water) was added to a 10 gallon reactor. 12.9 lbs additional water and 33.3 lbs 1-methoxy-2-propanol were added to the reactor with stirring. 2.5 lbs of 3-methacryloxypropyltrimethoxysilane was added slowly to the reactor with stirring. 0.021 lbs of a 5% solution in water of Prostab 5198 was added to the reactor with stirring. The mixture was stirred 18 hours at 80° C.

The reaction mixture was heated under vacuum (24-40 torr) and the 1-methoxy-2-propanol/water azeotrope was distilled off to remove substantially all of the water, while slowly adding 70.5 lbs of additional 1-methoxy-2-propanol. 0.4 lbs of 30% ammonium hydroxide was added to the reaction mixture, then the reaction was concentrated to 59.2% solids by distilling off 1-methoxy-2-propanol. The surface modification reaction resulted in a mixture containing 59.2% surface modified zirconia ($ZrO_2$—SM), by weight, in 1-methoxy-2-propanol. The final mixture was filtered through a 1 micron filter.

High Refractive Index Formulation

A hardcoat formulation was prepared, as follows, as the High Refractive Index Formulation. 246.6 grams 2-butanone (EMD Chemicals), 94.1 grams SR399, and 16.1 grams Irgacure 184 were added to a 2-L amber jar. The mixture was shaken until homogenous. 735.1 grams of $ZrO_2$—SM (59.2% solids in 2-methoxy-1-propanol) was added slowly to the mixture and gently mixed until homogenous. This results in a composition containing 50 wt-% solids. The final mixture was filtered through a 0.45 micron filter and then a 0.20 micron filter.

Surface Modified Silica Nanoparticles 305 grams of Nalco 2327 was added to a 1-liter reaction flask. 486 grams of 1-methoxy-2-propanol was added to the reactor with stirring. 19.38 grams of 3-methacryloxypropyl-trimethoxysilane was added slowly to the reactor with stirring. 0.15 grams of a 5% aqueous of Prostab 5198 was added to the reactor with stirring. The mixture was stirred 18 hours at 90° C.

The reaction mixture was heated under vacuum and the 1-methoxy-2-propanol/water azeotrope was distilled off with any necessary addition of 1-methoxy-2-propanol to remove substantially all of the water. The surface modification reaction resulted in a mixture containing 40% surface modified silica (Silica 20), by weight, in 1-methoxy-2-propanol.

Fluoroacrylate Polymer Intermediate A1

A hyperbranched copolymer was made as follows. 17.01 grams of C6DIACRY, 8.51 grams of CN4000, 2.84 grams of SR399, 1.70 grams of HFPO-TMPTA, 241.02 grams of ethyl acetate, 25.52 grams of methyl ethyl ketone, and 3.40 grams of Vazo 52 predissolved in the methyl ethyl ketone were charged into a reaction vessel. It is preferable to add the HFPO-TMPTA to the CN4000 first, then the remaining reagents.

The contents of the reaction vessel were degassed under nitrogen, and then heated 80° C. in a sealed bottle for 1 to 1.5 hours. Care must be taken to avoid building an excessive molecular weight and gelling the reaction contents. The concentration of the reactive species in the reaction mixture, the temperature of the reaction, and the reaction time were all selected to ensure this result, and one or more of these would need to be adjusted if different reactive species were used.

The fluoroacrylate polymer intermediate solution obtained was analyzed by Gel Phase Chromatography/Size Exclusion Chromatography according to the test method previously described. FIG. 4 depicts the chromatograph obtained.

Fluorinated Acrylate Monomer (B)

A monomer mixture solution, incorporating a fluorinated acrylate monomer, was prepared as follows. 39.79 grams of C6DIACRY, 13.14 grams of CN4000, 22.52 grams of SR399, sufficient of the surface modified Silica dispersion to yield 45.05 grams solids (the silica dispersions typically had 35-55% solids after the azeotrope removal), and 4.50 grams of Darocur 1173 (a photoinitiator), were each separately dissolved in methyl ethyl ketone to yield 10% by weight solutions or dispersions. The first three solutions were then blended in the order indicated so that the monomers were well-blended before addition to the silica nanoparticles and the Darocur 1173 was added last.

Low Refractive Index Formulation 1 (A1+B)

1250 grams of the Fluorinated Acrylate Monomer composition was placed in a container and 300 grams the Fluoroacrylate Polymer Intermediate composition having 10% solids concentration was carefully added with thorough mixing to avoid aggregation of the silica. Coating of the Low Refractive Index Formulation was performed within one week of this preparation.

Preparation of Antireflective Film 1

1. Coating and Curing the High Refractive Index Layer

The High Refractive Index Formulation containing the zirconia nanoparticles (optionally filtered through a 1 micron filter followed by a 0.2 micron filter) was coated onto the unprimed surface of a 5 mil PET film (obtained from Dupont) at 30 fpm. The solution was syringe-pumped into a 4 inch wide coating die at 12.45 cc/min. The coating was dried by passing through two 10 foot ovens each set at 120° C. The coating was then partially cured with a Light Hammer 6 UV source (Fusion UV Systems, Inc., Gaithersburg, Md.), at 25% power, under nitrogen. The resulting partially cured high refractive index layer was approximately 4 microns thick.

2. Coating and Curing the Low Refractive Index Layer

The Low Refractive Index Formulation was coated onto the partially cured High Refractive Index Layer. It is desired to have a first-order minimum in the reflection curve close to the design wavelength of 550 nm. In order to achieve this, the low index coating is targeted to have a dried thickness of 90-100 nm.

3. Coatings of the Low Refractive Index Formulation were performed on a web coater or by using wire-wound coating rods (Mayer rods). When using wire rods, the 10% solids solution was diluted to 3 or 5 percent total solids using MEK containing 0-10% cyclohexanone, a higher-boiling solvent, to prevent evaporative streaking. Standard techniques known in the coating art were employed. For example, a 5% solution was coated with a #2.5 Mayer rod with a rapid draw, and a 3% solution was coated with a #5 Mayer rod with a rapid draw, or with a #4 Mayer rod with slower draw.

The Low Refractive Index Layer coating was air dried at room temperature for 1 to 10 minutes depending on the coating solvent.

The Low Refractive Index Layer coated on the High Refractive Index Layer were then photocured at 100% power, at 10 fpm, under nitrogen, using the Light Hammer 6 previously described.

Surface Testing Methods of Antireflective Films

Contact Angle—The surface of the cured low refractive index layer was rinsed for 1 minute by hand agitation in IPA before being subjected to measurement of water and hexadecane contact angles. Measurements were made using as-received reagent-grade hexadecane (Aldrich) and deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops, and are shown in Table 2. Drop volumes were 5 μL for static measurements and 1-3 μL for advancing and receding. For hexadecane, only advancing and receding contact angles are reported because static and advancing values were found to be nearly equal.

Steel Wool Durability Test

The abrasion resistance of the cured films was tested cross-web to the coating direction by use of a mechanical device capable of oscillating a steel wool sheet adhered to stylus across the film's surface. The stylus oscillated over a 60 mm wide sweep width at a rate of 210 mm/sec (3.5 wipes/sec) wherein a "wipe" is defined as a single travel of 60 mm. The stylus had a flat, cylindrical base geometry with a diameter of 3.2 cm. The stylus was designed for attachment of weights to increase the force exerted by the steel wool normal to the film's surface. The #0000 steel wool sheets were "Magic Sand-Sanding Sheets" available from Hut Products Fulton, Mo. The #0000 has a specified grit equivalency of 600-1200 grit sandpaper. The 3.2 cm steel wool discs were die cut from the sanding sheets and adhered to the 3.2 cm stylus base with 3M Brand Scotch Permanent Adhesive Transfer tape. A single sample was tested for each example, with a 500 g or 1 kg weight and the number of wipes employed during testing as reported. The sample was then visually inspected for scratches. Ink repellency and contact angle was also evaluated.

Ink Repellency

After Steel Wool rubbing, the surface was then marked with a permanent marking pen (trade name Sharpie, Sanford Corp., Oakbrook, Ill.). The pen was held at an angle as far away as possible from normal to the film, and the broad side of the marking tip was pressed firmly and slid across both the steel wool-rubbed and the untouched surfaces of the test specimen. The ink marking on the untouched portion of the test specimen typically dewet into a string of small beads or droplets approximately 1 mm in size. The test specimen is said to pass the Ink Repellency test if the behavior of the ink in the steel wool-rubbed area is substantially the same as an untouched area of the surface.

Test Results of Antireflective Film 1

Most of the tested specimens of cured film prepared from Low Refractive Index Formulation 1 did not exhibit any scratches after 300 wipes according to the Steel Wool Durability Test.

Most of the tested specimens of the cured film prepared from Low Refractive Index Formulation 1 passed the Ink Repellency test after 300 wipes according to the Steel Wool Durability Test. Some specimens exhibited the onset of failure at 400 wipes.

The advancing and static water contact angles of cured film prepared from Low Refractive Index Formulation 1 were 112° and 102°, respectively prior to Steel Wool Durability Testing. After 300 wipes in the Steel Wool Durability Test, the corresponding contact angles were 111° and 102°. After 400 wipes, the corresponding angles were still 111° and 102°. After 500 wipes, the corresponding angles were 106° and 97°, indicating the beginning of the onset of wear on the cured coated film specimens of Example 1 at this high level of Steel Wool testing.

The reflectance of Antireflective Film 1 was evaluated and determined to have an average front surface reflection of less than 2% for wavelengths ranging from about 450 nm to 650 nm.

Fluoroacrylate Polymer Intermediate A2

A hyperbranched copolymer was made as follows. 1.200 grams of C6DIACRY, 8.50 grams of ethyl acetate, and 0.120 grams of Vazo 52 were charged to a reaction vessel.

The reaction was carried out by methods similar to those used for the Fluoroacrylate Polymer Intermediate synthesis of Example 1. No precipitation or gelation was observed in the product of the reaction.

Low Refractive Index Formulation and Coating (A2+B)

1.0 gram of the Fluoroacrylate Polymer Intermediate 2 was mixed with 4.2 grams of the Fluorinated Acrylate Monomer previously described. This was diluted in the same manner as previously described to 3% solids, and the resulting solution was coated with a #5 Mayer rod and cured onto the same substrate (PET film with a High Refractive Index Layer) as previously described.

The coating exhibited a few dewets or other minor irregularities in coating uniformity, but the quality was adequate. The cured film exhibited good ink repellency. The film bearing the cured coatings was subjected to 300 wipes steel according to the Steel Wool Durability Test. Observable ink repellency remained after the steel wool treatment. The coating quality was visibly more uniform than that of a control made identically except for the omission of the 1.0 gram of the Fluoroacrylate Polymer Intermediate 2.

Fluoroacrylate Polymer Intermediate A3

The conditions of Fluoroacrylate Polymer Intermediate Example 2 were repeated with only one change: 1.200 grams of CN 4000 were substituted for the 1.200 grams of C6DIACRY in the Fluoroacrylate Polymer Intermediate. All results were nearly identical, except that the minor coating quality defect took the form of a slight mottle rather than a few dewets.

Synthesis of Fluoroacrylate Polymer Intermediates 4-12

The samples were made by combining all ingredients depicted in Table 1 as follows in a vial, purging with nitrogen for 1 minute and then heating the sealed vial at 80° C. for one hour.

TABLE 1

| Fluoroacrylate Polymer Intermediate | C6DIACRYL | CN 4000 | Et. Acet. | Vazo 52 |
|---|---|---|---|---|
| 4 | 11.36 | 0 | 88.43 | 0.21 |
| 5 | 10.92 | 0 | 88.50 | 0.58 |
| 6 | 10.50 | 0 | 88.55 | 0.94 |
| 7 | 8.91 | 2.45 | 88.43 | 0.21 |
| 8 | 8.57 | 2.35 | 88.50 | 0.58 |
| 9 | 8.24 | 2.26 | 88.55 | 0.94 |
| 10 | 6.37 | 4.99 | 88.43 | 0.21 |
| 11 | 6.12 | 4.80 | 88.50 | 0.58 |
| 12 | 5.89 | 4.62 | 88.55 | 0.94 |

Synthesis of Michael Adduct 1

A 50 mL round bottom flask was equipped with magnetic stir bar and charged with 8F HDDA 1 g (0.00270 moles) under $N_2$ atmosphere and then 0.0793 g (0.00090 moles) of N-Methyl-1,3-propanediamine (purchased from Alfa Aesar, Wardhill, Mass.) was added drop wise at room temperature. The reaction was exothermic and was allowed to stir at room temperature for 30 minutes. Then the reaction mixture was heated at 55° C. for 3 hours. Heating was stopped and a sample was taken and analyzed by NMR. The product obtained in quantitative yield was used as such in formulation.

Synthesis of Michael Adduct 2

A 10 mL round bottom flask was equipped with magnetic stir bar and charged with 8F-HDDA 2.59 g (0.0070 moles)

and then 0.20 g (0.00175 moles), of 4-(aminomethyl)piperidine was added drop wise in 3 aliquots from 100 microliter syringe at room temperature over about 9 min (a 4:1 ratio). The flask was placed in a 55° C. bath and stirred under nitrogen for 3 h. The sample of the material was analyzed by $^1$H NMR and the product was used without further modification in formulating.

Preparation of Low Index Coating Compositions:

Low index coating compositions 2-11 were prepared from the components shown in Table 2 below, with each component at 3% solids in MEK. This was added in the order from the left column to the right column. This formulation was shaken or ultrasonicated to thoroughly mix the material.

Coating of the Low Refractive Index Layer

The compositions of Table 2 were coated on the high index hard coat (HIHC) (25% UV, 30 fpm) using a #4 coating rod. The first-order minimum reflection (min. % R) was targeted to be 550 nm (i.e. a uniform thickness of 95 nm). The coatings were UV cured (100% UV cure 500w H bulb, N$_2$, cure low index coating at 10 fpm/2 pass).

The steel wool test results of the resulting antireflective films are shown in Table 3.

TABLE 2

| Low Index Composition | Fluoroacrylate Polymer Intermediate (No. from Table 1) Wt-% | CN4000 | Michael Adduct (No.) Wt-% | Surface Modified Silica | SR399 | Irganox 127 |
|---|---|---|---|---|---|---|
| 2 | (4) 35 | 15 | (1) 25 | 20 | 5 | 3 |
| 3 | (5) 35 | 15 | (1) 25 | 20 | 5 | 3 |
| 4 | (6) 35 | 15 | (1) 25 | 20 | 5 | 3 |
| 5 | (7) 35 | 15 | (1) 25 | 20 | 5 | 3 |
| 6 | (8) 35 | 15 | (1) 25 | 20 | 5 | 3 |
| 7 | (9) 35 | 15 | (1) 25 | 20 | 5 | 3 |
| 8 | (10) 35 | 15 | (1) 25 | 20 | 5 | 3 |
| 9 | (11) 35 | 15 | (1) 25 | 20 | 5 | 3 |
| 10 | (12) 35 | 15 | (1) 25 | 20 | 5 | 3 |
| 11 | (11) 35 | 15 | (2) 25 | 20 | 3 | 3 |

TABLE 3

| Low Index Composition | min. % R | nm | 1 kg/25 rubs | 1 kg/50 rubs | 1 kg/100 rubs |
|---|---|---|---|---|---|
| 2 | 4.38 | 491 | NS-IR | NS-IR | NS-PIR |
| 3 | 3.47 | 535 | NS-IR | NS-IR | NS-PIR |
| 4 | 4.76 | 399 | NS-IR | NS-IR | NS-PIR |
| 5 | 2.67 | 495 | NS-IR | NS-IR | NS-IR |
| 6 | 2.79 | 491 | NS-IR | NS-IR | NS-IR |
| 7 | 2.71 | 489 | NS-IR | NS-IR | NS-IR |
| 8 | 2.59 | 460 | NS-IR | S-IR | S-IR |
| 9 | 2.55 | 455 | NS-IR | S-IR | S-IR |
| 10 | 2.57 | 440 | NS-IR | S-IR | S-IR |
| 11 | 2.18 | 620 | NS-IR | NS-IR | NS-IR |

IR—ink repellent,
PIR—partial ink repellent
NS—No Scratch
S—Scratch

What is claimed is:

1. A low refractive index polymerizable organic composition comprising
A) at least 5 wt-% of a free-radically polymerizable fluorinated polymer dissolved or dispersed in an organic solvent wherein the fluorinated polymer comprises the reaction product of
i) at least one multi-functional free-radically polymerizable material having a fluorine content of at least about 25 wt-%, and
ii) optionally at least one multi-functional free-radically polymerizable material having a fluorine content ranging from 0 to less than 25 wt-%,
wherein the total amount of multi-functional free-radically polymerizable material is at least 60 wt-% based on wt-% solids,
wherein the fluorinated polymer comprising comprises polymeric species having a hyperbranched structure; and
B) at least one fluorinated free-radically polymerizable material.

2. The low refractive index composition of claim 1 wherein the polymer is present at a concentration of at least about 10 wt-% solids.

3. The low refractive index composition of claim 1 wherein the organic solvent is non-fluorinated.

4. The low refractive index composition of claim 1 wherein the composition has at least a bimodal molecular weight distribution.

5. The low refractive index composition of claim 1 wherein the composition comprises at least 10 wt-% of reaction products having a polystyrene equivalent Mw of greater than 1,000,000 g/mole.

6. The low refractive index composition of claim 1 wherein the composition comprises about 20 wt-% of reaction products having a polystyrene equivalent Mw ranging from about 5,000 g/mole to 1,000,000 g/mole.

7. The low refractive index composition of claim 1 further comprising unreacted free-radically polymerizable materials.

8. The low refractive index composition of claim 1 wherein the low refractive index composition comprises the reaction product of at least one monofunctional free-radically polymerizable material.

9. The low refractive index composition of claim 8 wherein the monofunctional material has a fluorine content of at least 25 wt-%.

10. The low refractive index composition of claim 1 wherein the low refractive index composition comprises at least one crosslinker having at least three free-radically polymerizable groups.

11. The low refractive index composition of claim 10 wherein the crosslinker is non-fluorinated.

12. The low refractive index composition of claim 1 wherein the free-radically polymerizable materials comprise (meth)acrylate materials.

13. The low refractive index composition of claim 1 wherein the fluorinated free-radically polymerizable materials are selected from fluoroalkylene materials and fluoropolyether materials.

14. The low refractive index composition of claim 13 wherein the fluorinated free-radically polymerizable materials comprises a fluoroalkylene material.

15. The low refractive index composition of claim 14 wherein the fluorinated free-radically polymerizable materials comprise a Michael-adduct of a reactive fluoroalkylene multi-(meth)acrylate and an amine compound.

16. The low refractive index composition of claim 15 wherein the amine compound comprises 2 to 4 Michael-type addition hydrogens.

17. A low refractive index layer comprising the dried and cured composition of claim 15.

18. A low refractive index layer comprising the dried and cured composition of claim 1.

19. The low refractive index layer of claim 18 wherein the composition further comprises surface modified inorganic nanoparticles having a refractive index less than 1.50.

20. The low refractive index layer of claim 18 wherein the low refractive index layer has a refractive index of less than 1.47.

21. The low refractive index composition of claim 1 wherein the total amount of multi-functional free-radically polymerizable material is at least 70 wt-%.

22. The low refractive index composition of claim 1 wherein the total amount of multi-functional free-radically polymerizable material is at least 80 wt-%.

23. The low refractive index composition of claim 1 wherein the total amount of multi-functional free-radically polymerizable material is at least 90 wt-%.

24. The low refractive index composition of claim 1 wherein at least 50 wt-% solids of the polymerizable organic composition comprises free-radically polymerizable material(s) having a fluorine content of at least 25 wt-%.

25. A method of making an antireflective film comprising
A) providing a polymerizable organic composition comprising a free-radically polymerizable polymeric intermediate composition by solution polymerizing
   i) at least one multi-functional free-radically polymerizable material having a fluorine content of at least about 25 wt-%, and
   ii) optionally at least one multi-functional free-radically polymerizable material having a fluorine content ranging from 0 to less than 25 wt-%,
wherein the total amount of multi-functional free-radically polymerizable material is at least 60 wt-% wt-% based on wt-% solids;
B) combining the polymeric intermediate composition with at least one fluorinated free-radically polymerizable material;
C) coating the composition of B) onto a high refractive index layer;
D) photocuring the coated composition of B).

* * * * *

UNITED STATES PATENT AND TRADEMARK OFFICE
CERTIFICATE OF CORRECTION

PATENT NO. : 8,231,973 B2
APPLICATION NO. : 12/303584
DATED : July 31, 2012
INVENTOR(S) : Marc D Radcliffe It is certified that error appears in the above-identified patent and that said Letters Patent is hereby corrected as shown below:

Title Page
Column 1, below "(65) Prior Publication Data" insert -- (60) Related U.S. Application Data, U.S. Application No. 11/423,791, filed June 13, 2006. --.

Column 4
Line 20, Delete "hyberbranched" and insert -- hyperbranched --, therefor.

Column 6
Line 59, Delete "endgroup" and insert -- end group --, therefor.

Column 7
Line 51-59, Below "52.02 wt-%."
delete "Another preferred high fluorine containing multi-functional free-radically polymerizable material is a (per)fluoro alkylene multi-(meth)acryl compound prepared by a Michael-type addition of a reactive (per)fluoro alkylene multi-(meth)acrylate with an amine compound having 2 to 4 Michael-type addition hydrogens. One exemplary adduct is prepared by the reaction of $CH_2=CHC(O)-OCH_2(CF_2)_4CH_2O-C(O)CH=CH_2$ (commonly referred to as 8F-HDDA) with N-methyl-1,3-propanediamine.".

Column 8
Line 4, Delete "Fluor N" and insert -- FluorN --, therefor.
Line 7, Delete "Fluor N" and insert -- FluorN --, therefor.
Line 7, Delete "1970A"" and insert -- 1970A". --, therefor.

Column 8
Line 51, Below "Table 1" insert -- Another preferred high fluorine containing multi-functional free-radically polymerizable material is a (per)fluoroalkylene multi-(meth)acryl compound prepared by a Michael-type addition of a reactive (per)fluoroalkylene multi-(meth)acrylate with an amine compound having 2 to 4 Michael-type addition hydrogens. One exemplary adduct is prepared by Signed and Sealed this
Thirteenth Day of November, 2012

David J. Kappos
*Director of the United States Patent and Trademark Office* the reaction of $CH_2$=CHC(O)—$OCH_2(CF_2)_4CH_2$O—C(O)CH=$CH_2$ (commonly referred to as 8F-HDDA) with N-methyl-1,3-propanediamine. --, the same on Col. 8, Line 51 (approx.) as a new paragraph.

Column 14
Line 44, Delete "Collodial" and insert -- Colloidal --, therefor.

Column 15
Line 49, Delete "dependant" and insert -- dependent --, therefor.

Column 17
Line 30, Delete "N4D2A" and insert -- N4D2A. --, therefor.

Column 22
Line 45, Delete "11t)," and insert -- lit), --, therefor.

Column 24
Line 39, Delete "Deleware" and insert -- Delaware --, therefor.

Column 28
Line 55, Delete "8F HDDA" and insert -- 8F-HDDA --, therefor.
Line 62, Before "NMR" insert -- $^1$H --.

Column 30
Line 10, In Claim 1, delete "comprising comprises" and insert -- comprises --, therefor.

Column 32
Line 12, In Claim 25, delete "wt-% wt-%" and insert -- wt-% --, therefor.